Nov. 10, 1970  A. O. FITZNER  3,539,789
SELECTIVE DIAL-IN REPRESENTATION OF DIGITAL
NUMBERS FOR MACHINE TOOL CONTROL
Filed Feb. 28, 1967  10 Sheets-Sheet 2
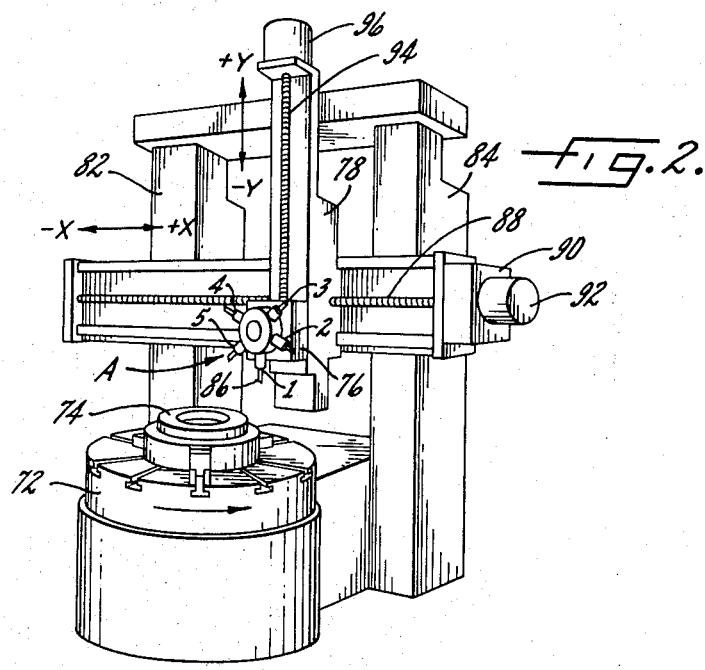
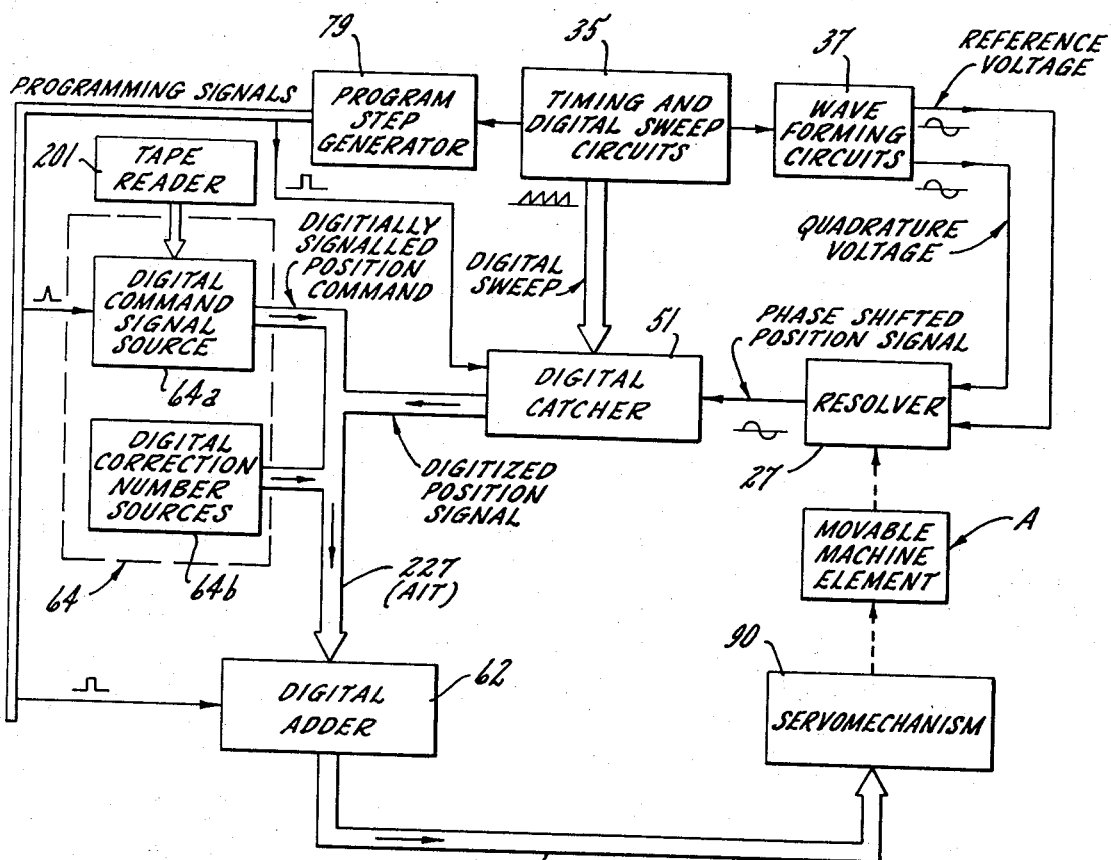
INVENTOR.
ARTHUR O. FITZNER,
BY
Wolfe, Hubbard, Voit & Osann
ATTORNEYS.

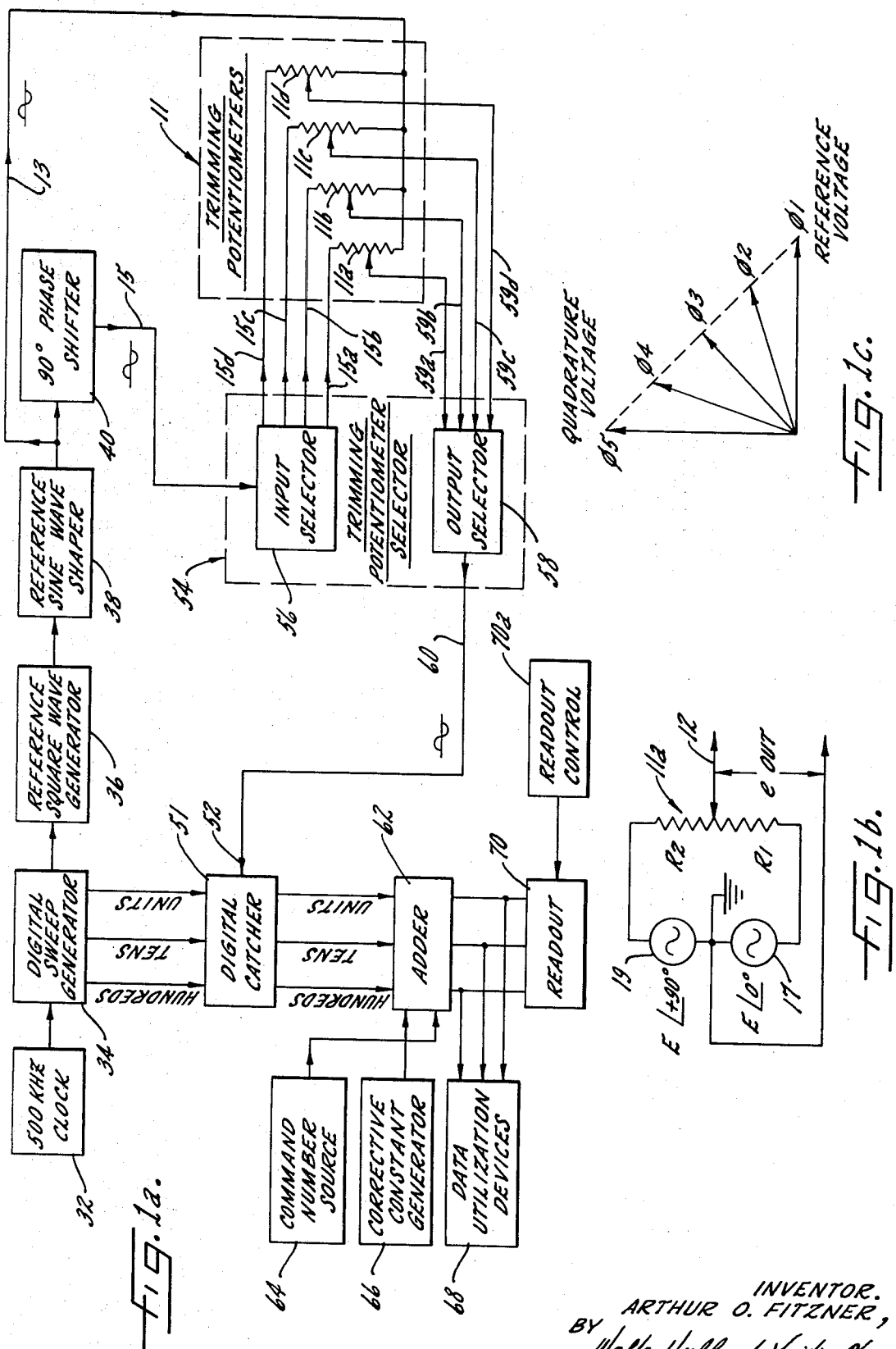

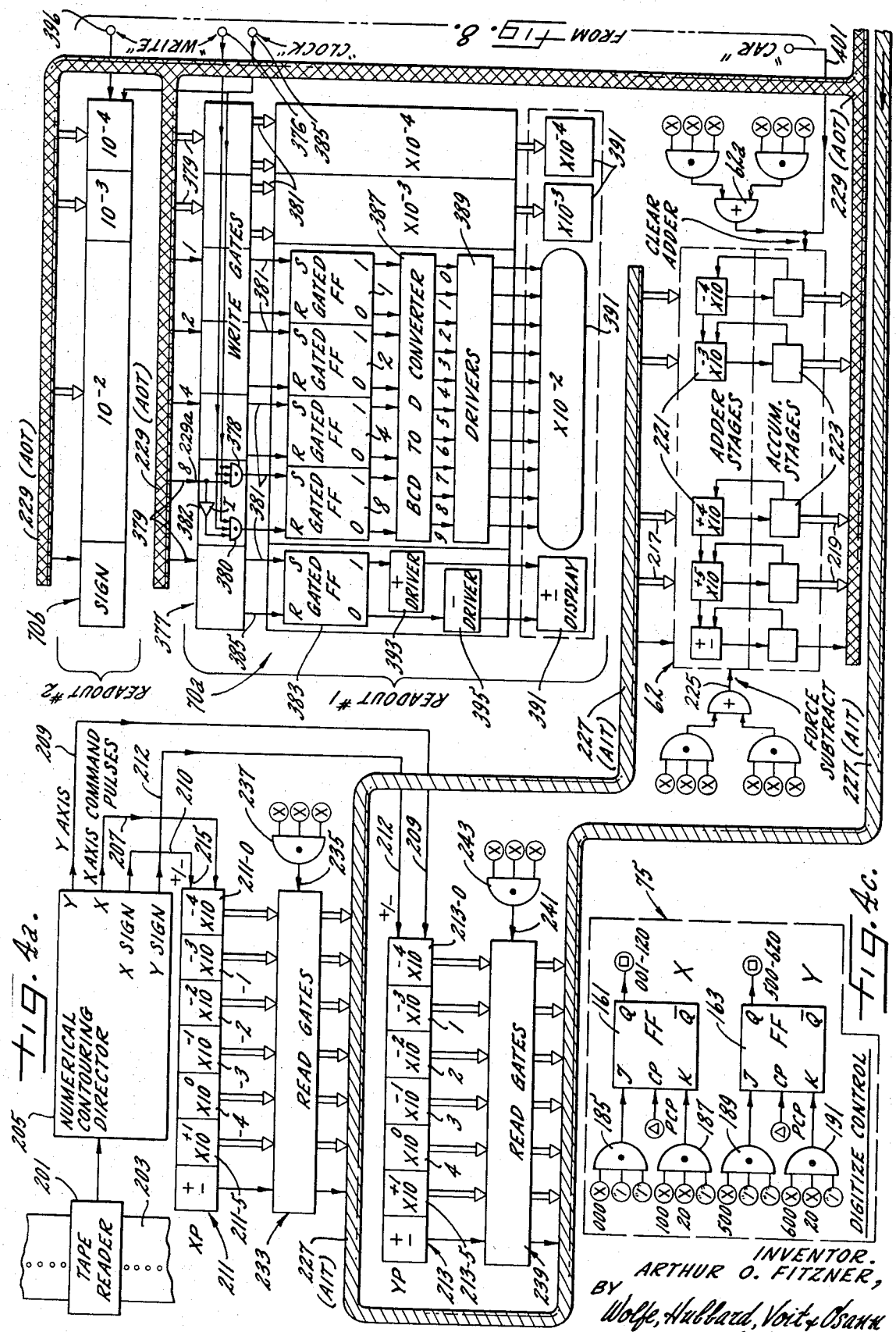

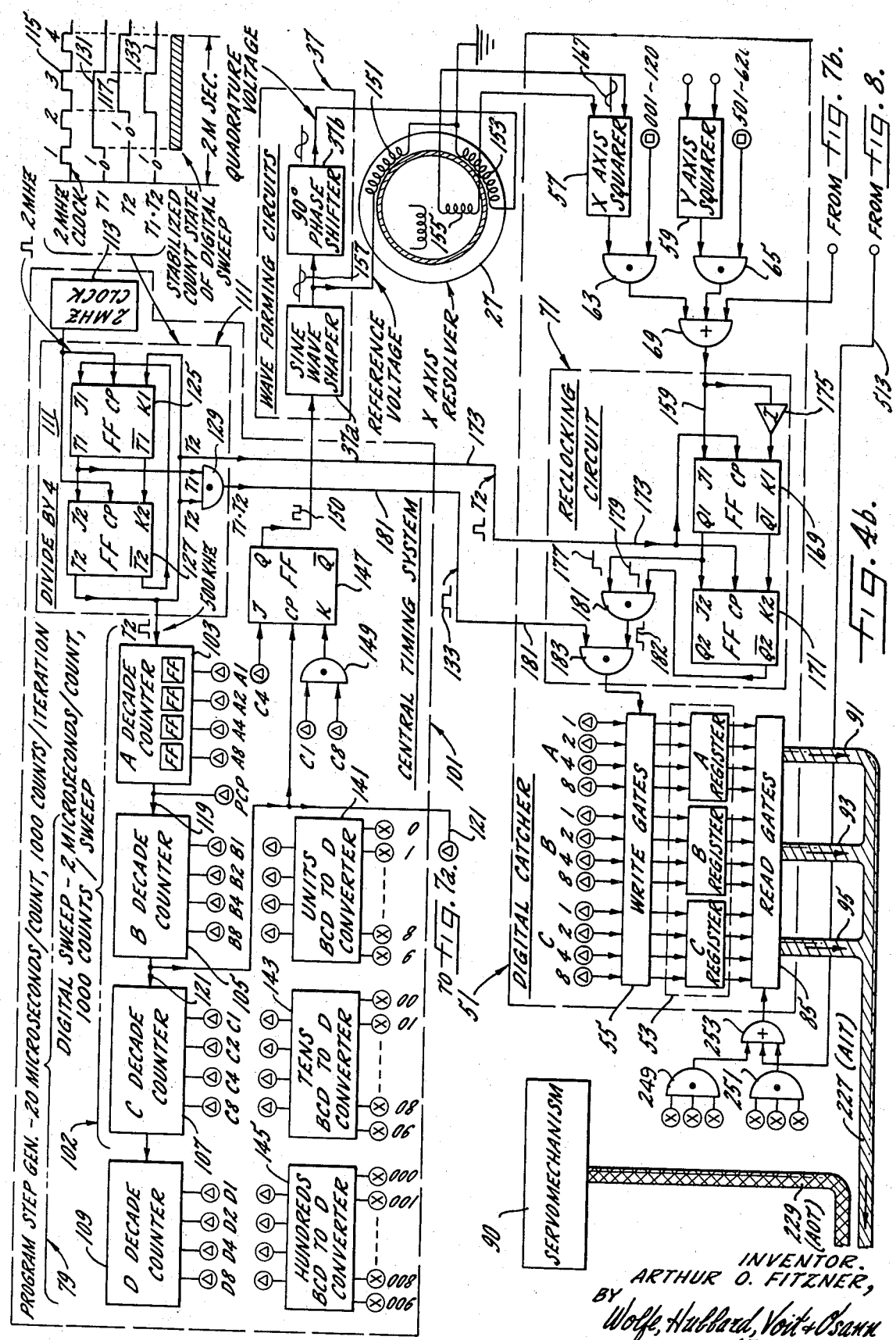

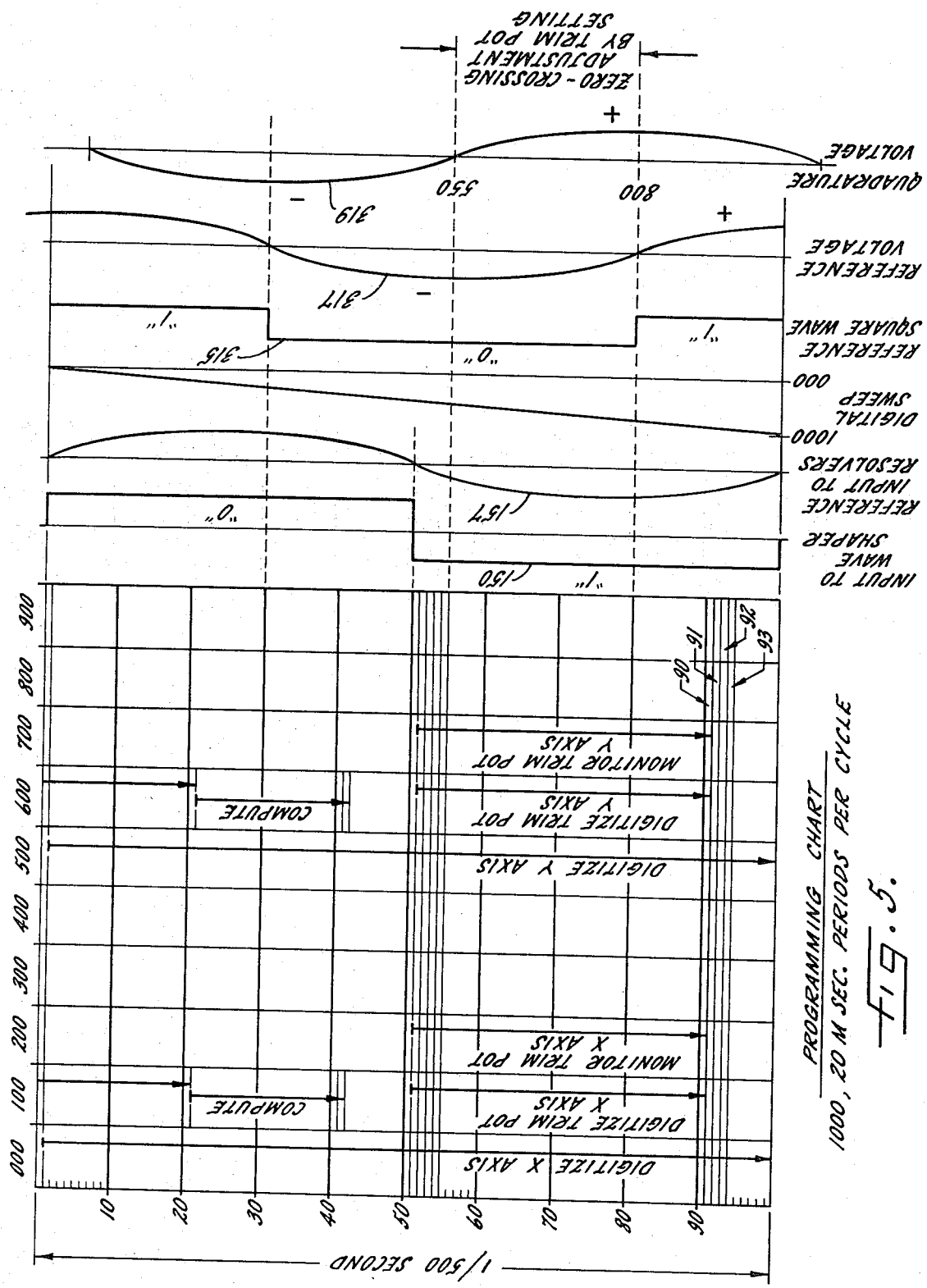

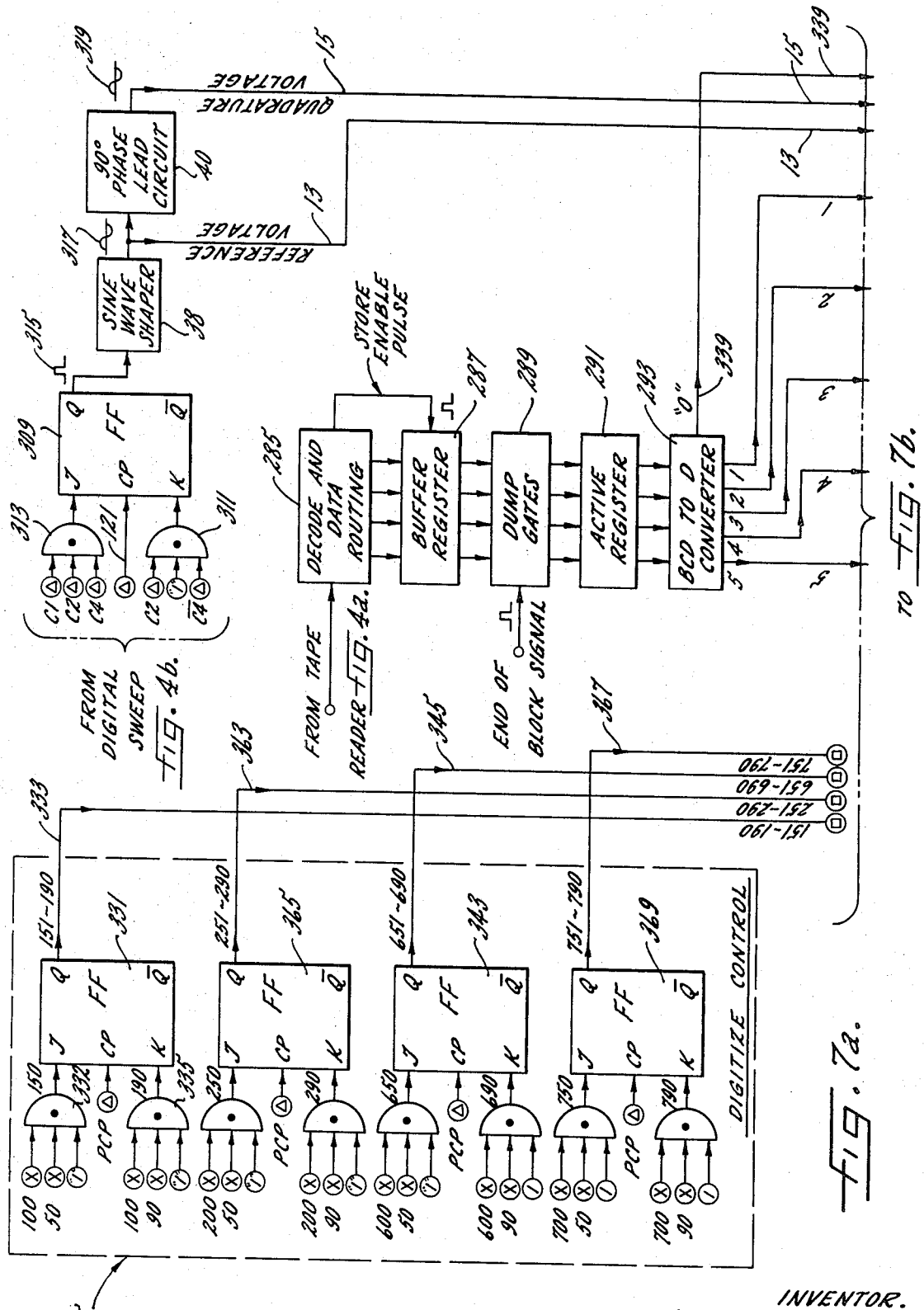

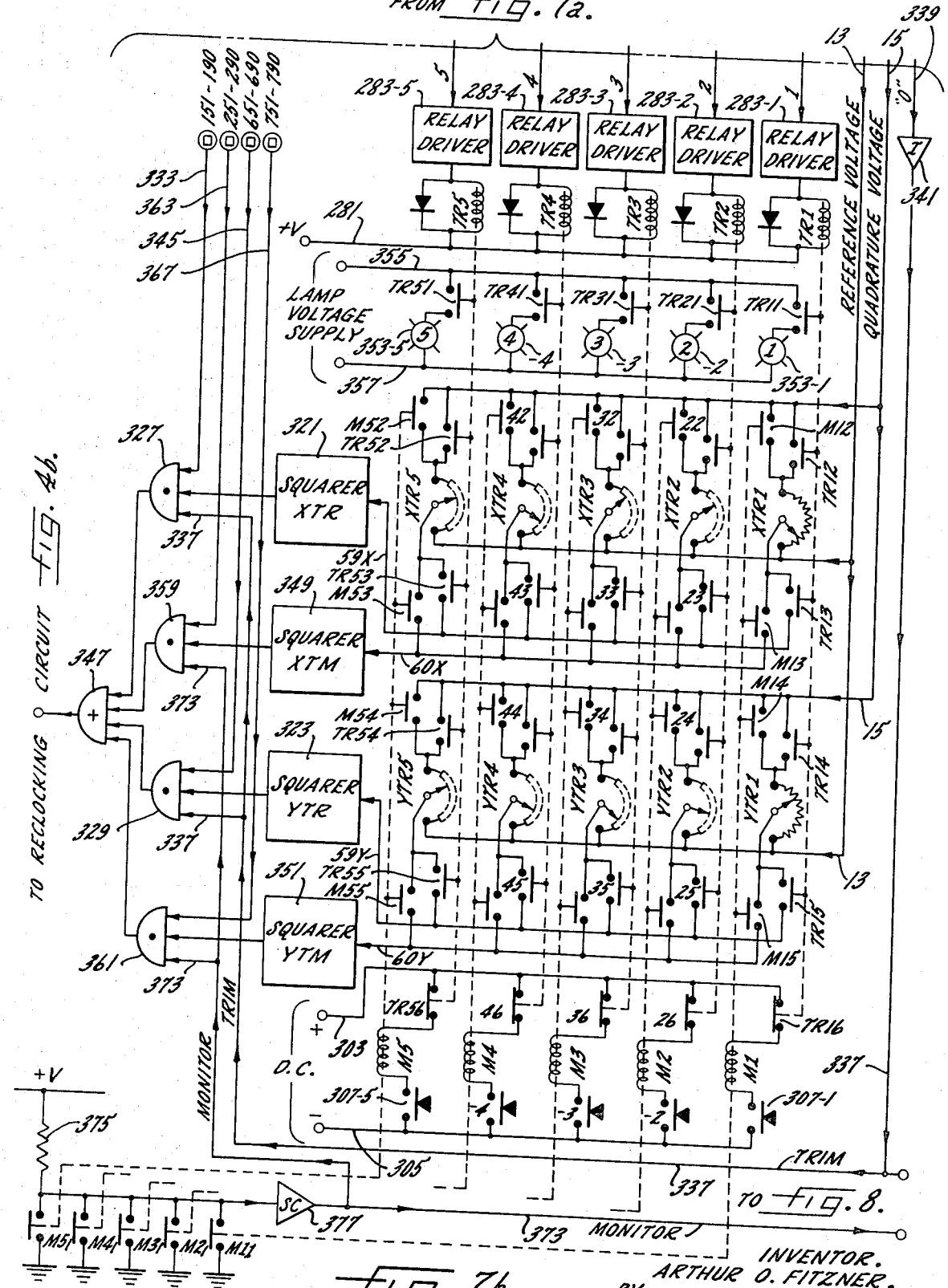

Nov. 10, 1970

A. O. FITZNER 3,539,789

SELECTIVE DIAL-IN REPRESENTATION OF DIGITAL
NUMBERS FOR MACHINE TOOL CONTROL

Filed Feb. 28, 1967

INVENTOR.
ARTHUR O. FITZNER,
BY Wolfe, Hubbard, Voit & Osann
ATTORNEYS.

Nov. 10, 1970            A. O. FITZNER            3,539,789
SELECTIVE DIAL-IN REPRESENTATION OF DIGITAL
NUMBERS FOR MACHINE TOOL CONTROL

Filed Feb. 28, 1967            10 Sheets-Sheet 10

INVENTOR.
ARTHUR O. FITZNER,
BY Wolfe, Hubbard, Voit + Osann
ATTORNEYS.

United States Patent Office 3,539,789
Patented Nov. 10, 1970

3,539,789
SELECTIVE DIAL-IN REPRESENTATION OF DIGITAL NUMBERS FOR MACHINE TOOL CONTROL
Arthur O. Fitzner, Fond du Lac, Wis., assignor to Giddings & Lewis, Inc., Fond du Lac, Wis., a corporation of Wisconsin
Filed Feb. 28, 1967, Ser. No. 619,344
Int. Cl. H03k *13/00*
U.S. Cl. 235—154
19 Claims

ABSTRACT OF THE DISCLOSURE

In a numerical control for a machine tool, desired and actual machine tool positions are digitally signaled to a positioning servomechanism. In order to compensate for the individual characteristics of different tools in a turret, a digitally signaled correction number is produced for each of them. As the machine is instructed to index the various tools into working position, the correction numbers associated with those tools are utilized. The correction numbers are produced by the use of potentiometers, there being a bank of such potentiometers to accommodate the several tools. By adjusting the slider settings of the respective potentiometers, the correction numbers may be adjused to that required for the respective tools.

BACKGROUND OF THE INVENTION

In numerically controlled positioning systems such as those used on the machine tools, digitally signaled numerical data representing desired and actual instantaneous position are fed to a servomechanism which compares the data and produces motion in a direction and at a velocity which tends to bring actual position into conformance with desired position. The ultimate object of such systems is to reduce error to a minimum, i.e., to continue to move the controlled movable element so that its actual position agrees accurately with the position which it is commanded to have at all times. Accurate numerical indication therefore of the desired position of the controlled movable element is a necessity.

In a typical numerically controlled machine tool, several working tools are mounted on a rotatable turret and are successively indexed into operative position as the machine is programmed through its sequence of desired operation. Each tool in the turret may have individual characteristics for which compensation must be made if the desired position is to be accurately signaled. It is to the provision of a set of inexpensive devices by which individual compensation may be made for the peculiarities of several tools in a machine tool that the present invention is principally directed, although it will be apparent that the invention has utility in other fields as well.

OBJECTS OF THE INVENTION (1) To produce a recurring signal such as a sine wave, the phase of which can be controlled by the setting of a potentiometer.

(2) To produce a digitally signaled multi-digit number whose value can be controlled by the setting of a potentiometer.

(3) To derive from a Digital Sweep Generator a digitally signaled number whose value may be controlled by means of a potentiometer.

(4) To provide an inexpensive means whereby a digitally signaled number can be produced, its value being adjustable by means of a potentiometer, with means to display visually the value produced as the setting of the potentiometer is changed so as to permit altering the setting of the potentiometer until the display indicates that the number is of the desired value.

(5) To derive from a Digital Sweep Generator which produces a number cyclically changing from a first to a second predetermined value a digitally signaled number whose value may be varied by means of a potentiometer across a desired range of negative and positive values.

(6) To derive from a single digital sweep a plurality of digitally signaled numbers, each of which may be varied across a range of values by respective ones of a bank of potentiometers.

(7) Automatically to produce by means of inexpensive potentiometers a digitally signaled number for each tool of a rotating turret type of machine as respective tools in the turret are indexed into position.

BRIEF DESCRIPTION OF THE DRAWINGS

Other objects and advantages will become apparent as the following description proceeds, taken in conjunction with the following drawings in which:

FIGS. 1*a*–1*c* are general block diagrams of a digital number generating system;

FIG. 2 is a perspective view of a machine tool shown to provide one example of a typical application of features of the invention;

FIG. 3 is a general block diagram of a numerical control system for the machine tool of FIG. 2, and including certain of the devices used to form the inventive combination shown in FIG. 1;

FIG. 4, formed of FIGS. 4*a*, 4*b*, and 4*c* when joined as indicated thereon, is a detailed block diagram of the system shown generally in FIG. 3;

FIG. 5 is a programming chart designed to illustrate time periods during which operations performed by the systems shown in FIGS. 1 and 4 take place;

FIG. 7, formed of FIGS. 7*a*–7*b* when joined together as indicated, is a detailed block diagram of those portions of the system generally shown in FIG. 1 whereby phase variable signals are produced by means of a bank of potentiometers;

FIG. 8 is a detailed diagram of components generally shown in FIG. 1 by which digitally signaled numbers produced by the components shown in FIG. 7 are caused to be displayed by the display device shown in detail in FIG. 4 and also showing components generally indicated in FIG. 1 by which a correction number used to modifiy numbers produced by the potentiometers of FIG. 7 is injected at appropriate times into the adder shown in FIG. 4.

Figure 6:
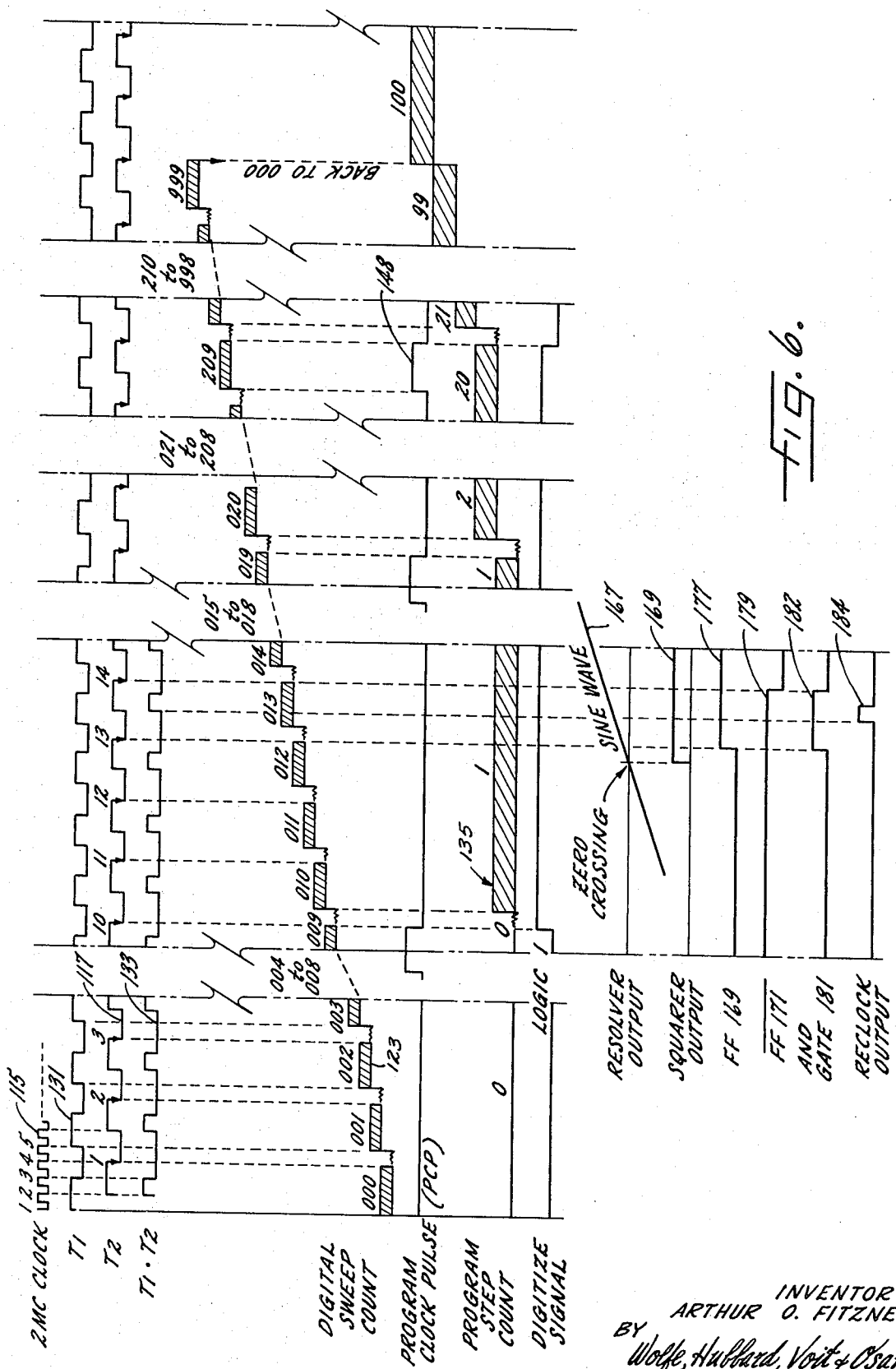
FIG. 6 is a set of wave forms principally to illustrate the time relationships of pulses produced by components of the system shown in FIG. 4.

While the invention has been shown and will be described in some detail with reference to a preferred embodiment thereof, there is no intention that it thus be limited to such detail. On the contrary, it is intended here to cover all modifications, alternatives, and equivalents falling within the spirit and scope of the invention as defined by the appended claims.

A DIGITAL NUMBER GENERATING SYSTEM IN GENERAL

In accordance with the invention, a phase variable voltage is produced by means of one or more potentiometers energized by a single sinusoidal voltage or a pair of sinusoidal voltages whose phases differ by a predetermined amount. The phase variable voltage is converted into a digitally signaled number whose value may be controlled by adjusting the setting of the one or more potentiometers.

In accordance with a further feature of the invention, a bank or a series of potentiometers, each energized in the manner just described and each producing a phase variable voltage whose phase relative to that of the energizing voltage is controllable by adjustment of the potentiometer wiper.

In the preferred embodiment of the invention, a single potentiometer is used, its resistive portion being connected across a pair of energizing voltages which are 90° out of phase with one another so that as the slider of the potentiometer is traversed across its full range, the phase of the voltage appearing on the slider varies between that of the voltages energizing the potentiometer. A bank 11 of such trimming potentiometers is illustrated in FIG. 1a, shown as comprising four individual potentiometers 11a, 11b, 11c, and 11d. Over a first line 13, a reference sinusoidal voltage is applied to one extremity of each of the potentiometers 11 and over a second line 15 a quadrature voltage leading the reference voltage by 90° is applied to the other extremity of each of the potentiometers 11.

To illustrate more clearly, the manner in which the potentiometers 11 are energized, one of them, the potentiometer 11a, is drawn by itself in FIG. 1b. Connected between one extremity of the potentiometer 11a and ground is a reference sine wave generator 17. A quadrature sine wave generator 19 is connected between the opposite extremity of the potentiometer and ground. It will be understood, of course, that ground is used here for purpose of illustration only and that it merely represents a common point relative to which the voltage generators 17 and 19 produce their outputs.

The output of the potentiometer 11a appears between its slider and the common point between the voltage generators 17 and 19, here ground, and varies in phase between that of the generator 17 and that of the generator 19 in the manner illustrated in FIG. 1c. Vector $\phi 1$ labeled "Reference Voltage" represents the phase and magnitude of the voltage applied to the bottom extremity of the potentiometer 11a by the voltage source 17, while the vertical vector labeled "Quadrature Voltage" represents the magnitude and phase of the voltage applied to the upper extremity of the potentiometer 11a by the voltage source 19. The vector $\phi 1$ represents also the phase and magnitude of the voltage appearing between the slider 12 and the reference point, ground, when the resistance R1 between the slider and its bottom extremity is zero, and similarly the vector $\phi 5$ also represents the magnitude and phase of the output voltage from the potentiometer 11a when the resistance R2 between the slider and the top extremity of the potentiometer is zero. The magnitudes and phases of voltages which appear on the slider 12 of the potentiometer as it traverses from bottom to top, i.e., from 0° phase angle to +90° phase angle, is shown by the intermediate vectors $\phi 2$, $\phi 3$, and $\phi 4$. Thus it is seen that as the wiper 12 traverses from one extremity of the potentiometer to the other, the phase of the voltage appearing on the slider relative to the phase of the voltage produced by the source 17 varies from 0° to 90° leading.

Returning to a consideration of the system shown in FIG. 1a, the reference voltage supplied on line 13 and the quadrature voltage supplied on line 15 are chosen to have a frequency of 500 cycles per second, and are derived from a 500 kilohertz clock 33 whose output is applied to a Digital Sweep Generator 34. The Digital Sweep Generator 34 produces a digital sweep formed of signals which digitally represent a reference number which during successive time intervals repeatedly and cyclically changes from a first to a second predetermined value by uniform increments and at uniformly time spaced instants. Thus the Digital Sweep Generator 34 has 1000 different count states, each of them occurring 500 times per second.

A 500 c.p.s. reference square wave having a constant, predetermined phase relative to the cycling intervals of the digital sweep is produced by a reference square wave generator 36. In response to a first count state of the Digital Sweep Generator 34, the reference square wave generator 36 produces a first voltage level at its output which it maintains until the occurrence of a second count state of the Digital Sweep Generator occurring 500 count states later, at which time the output of the generator 36 returns to its initial level. To produce a reference sine wave suitable for use as the reference voltage energizing the potentiometers, the output of the reference square wave generator 36 is applied to a reference sine wave shaper 38 which converts the square wave applied to its inputs into a sinusoidal voltage in phase therewith. The latter phase relationship is not critical and the system would work equally well if a phase shift were introduced by the reference sine wave shaper 38 so long as the output were a sine wave whose phase relative to the cycling periods of the Digital Sweep Generator 34 remained constant.

To produce the quadrature voltage appearing on line 15, the reference sine wave appearing at the output of the wave shaper 38 is applied to a 90° phase shifter 40 which produces a quadrature sinusoidal voltage leading the reference voltage by 90°, as required.

In carrying out the invention, the phase variable voltage produced by a trimming potentiometer 11 is applied to a digitizing device which is here shown as comprising the Digital Sweep Generator 34 and the Digital Catcher 50. By means of the digitizing device, a digitally signaled number is produced whose value is representative of the phase angle of the potentiometer output signal. In the particular digitizer shown employed, phase variable outputs produced by several trimming potentiometers may be converted into digital numbers derived from the sweep generator 34.

In the embodiment shown in FIG. 1a, outputs of several of the trimming potentiometers 11 are applied to the control input 52 of the Digital Catcher 50 through a Trimming Potentiometer Selector 54. The Trimming Potentiometer Selector 54 includes an Input Selector 56 for applying the quadrature voltage appearing on line 15 to a selected one or more of the potentiometers 11a–11d over lines 15a–15d respectively. The Trimming Potentiometer Selector 54 also includes an Output Selector 58 for applying the output appearing on the slider of one or more of the trimming potentiometers 11 over line 60 to the control input 52 of the Digital Catcher 50. By means to be described in detail subsequently, the Digital Catcher 50 is time shared to enable it to produce digital numbers representative of the outputs of several trimming potentiometers during successive, periodically recurring time periods. The means for accomplishing this are not shown in the general system diagram of FIG. 1a.

The digitally signaled number produced by the Digital Catcher 50 finds particular use in machine tool controls wherein they are employed to produce a modified position command number so as to compensate for errors which would otherwise be introduced by individual characteristics of various tools which are employed by the system. In such applications, the digitally signaled number representing the phase of the voltage produced by the trimming potentiometer 11 is applied to a digital adder 62 to which there are also applied the command signals produced by a command number source 64. It is in these applications that use of a plurality of trimming potentiometers is particularly desirable and each trimming potentiometer is adjusted to produce a digitally signaled number required by the peculiarities of a respective one of the tools employed on the machine tool. At appropriate times the trimming number produced by an appropriate one of the trimming potentiometers 11 is subtracted in the adder 62 from the command number produced by the source 64.

For purposes which will become clear as this description proceeds, it is sometimes desirable to introduce a corrective constant into the numbers which are produced by the trimming potentiometers 11. By introducing such a constant, the range of numbers which may be produced by the potentiometers as their sliders are traversed through their ranges may be varied and for this purpose a corrective constant generator 66 is provided. The corrective constant produced by the generator 66 appears as a numerically signaled number and is subtracted by means of the adder from each of the numbers produced under the control of the several trimming potentiometers 11.

The output of the adder 62 representing the command number as modified by a corrected trimming number is digitally signaled and is applied to data utilization devices 68 which in a numerical tool control are the servomechanisms used to position various machine elements.

In accordance with another feature of the invention, the "trim" number which a machine operator is "dialing" by means of one of the trimming potentiometers 11 is applied to a display device so as to enable him to observe the number which he is dialing, and thus to dial the exact trimming number which he desires. This display is part of a readout 70 controlled by a readout control 70a.

In the foregoing general description, the potentiometer means for controlling the magnitude of the trimming number produced were shown as including, for each trimming number, a single potentiometer energized by a pair of sinusoidal voltages phased 90° apart. This particular embodiment represents a preferred arrangement, but others, operating on similar principles may also be employed. Two possible modifications of the preferred circuit are shown in FIG. 9 and will be discussed subsequently. It should be noted at this point, however, that the potentiometer means may include a pair of ganged potentiometers powered by a single sinusoidal voltage and that it may alternatively include a single potentiometer connected in series with a capacitor and energized by a pair of voltages which are 180° out of phase with one another.

A MACHINE TOOL EXEMPLIFYING A TYPICAL APPLICATION OF FEATURES OF THE INVENTION

In order to illustrate a particular environment in which the present invention will find particularly advantageous use, it will be described here with reference to digitally signaling the desired position of elements of a numerically controlled machine tool along a pair of mutually orthogonal axes. A vertical turret lathe (shown in FIG. 2) is typical of the many different types of machine tools which may be numerically controlled. The exemplary machine tool includes a work table 72 rotatable about a vertical axis and adapted to carry a workpiece 74 which is to be machined to a desired contoured shape. Representative of a utilization device which is to execute a numerically defined motion program, a turret head A is fixed to and vertically movable with a ram 76 which is slidable within vertical ways (not shown) formed on a saddle 78, the latter in turn being movable horizontally along the ways of a rail which is supported at its opposite ends by spaced columns 82 and 84. A plurality of tools such as a cutter 86 may be mounted on the indexable turret head A and selectively brought to a working position. The outer 86 may thus be moved along horizontal and vertical X and Y axes relative to the workpiece 74, and, by proper coordination of the X and Y axis components of movement and velocity, the cutter will move through a desired path in space in order to cut a contour on the workpiece 74. To produce such controlled movement of the turret head A, along the X and Y axes, the saddle 78 includes a nut (not shown) engaged with a lead screw 88, driven through a gear box 90 by means of a reversible servomotor 92. As the latter motor is caused to rotate in one direction or the other at different speeds, the saddle 78 will be moved horizontally in +X or —X directions and at velocities determined by the speed of the motor. Correspondingly, the ram 76 carries a nut (not shown) engaged with a vertically disposed lead screw 94 driven by a reversible servomotor 96 so that energization of that motor in one direction or the other moves the turret head A and the cutter 86 in +Y or —Y directions.

As successive operations are to be performed on the workpiece 74, the indexable turret head A places successive tools in working position. Because of the peculiarities of individual tools in the turret, a given numerical position command signal may cause different tools to assume slightly different positions. It is to compensate for these errors by modifying the digitally signaled command number used to position the turret head and the tools therein, that digitally signaled trimming numbers are to be generated for respective ones of the tools in the turret head A.

A NUMERICAL CONTROL SYSTEM FOR THE EXEMPLARY MACHINE TOOL—IN GENERAL

Aspects of a numerical control system for a machine tool of the type shown in FIG. 2 are described in copending applications by John K. McGee, assigned to the assignee of the present invention, and entitled "Readout System for Selective Display of Digital Data on Time-Shared Conductors" (Ser. No. 618,699 filed Feb. 27, 1967) and "Method and System for Digitally Signaling Instantaneous Position" (Ser. No. 555,048 filed June 3, 1966). Such a system will be described herein in part, to permit a full understanding of the present invention with a minimum of cross reference to the referenced applications. It should be understood that, while the present invention is described herein as utilizing certain elements of the type of system disclosed in the referenced applications, this is merely one particularly advantageous environment and utilization of the invention. Thus, a system embodying the present invention need not, by any means, be used in combination or as a part of a system of the type described therein.

The numerical control system shown generally in FIG. 3 includes a resolver 27, geared to the movable machine element A, shown in FIG. 2 as the turret A, and producing a phase shifted position signal representing the position of the movable element A within a specific range of movement. The resolver is powered by a pair of sinusoidal voltages which are 90° out of phase with one another, produced by wave forming circuits 37 in turn driven by an output from timing and digital sweep circuits 35. The circuits 35 produced a digital sweep cycling periodically between two predetermined numbers, and this sweep is applied to a Digital Catcher 51 controlled by the phase shifted sinusoidal output of the resolver 27 to produce a digitized position signal representing in binary coded decimal form the position of the movable machine element A within the specific range of movement covered by the resolver 27.

Digitally signaled uncorrected position command signals are derived from a record medium, typically punched paper tape, by means of a digital command signal source 64a, and correction numbers for tool offset and the other factors are produced by the Digital Correction Number Sources 64b. Collectively, the units 64a and 64b comprise the Command Number Source 64 shown as part of the system of FIG. 1a.

To form a corrected command number, and to compare it with the actual position of the movable element A as indicated by the digitized position signal from the digitizer 51, a digital adder 62, corresponding to that previously identified in FIG. 1a, is provided. The signals to be compared are applied to the digital adder 62 over a multiconductor trunk line labeled AIT for Adder Input Trunk. The digital adder 62 adds the corrections to, and subtracts the digitally signaled number representing actual position from, the number representing command position and applies the result, representing the position error of the movable element A to a servomechanism 90 which includes the X axis servomotor 92 shown in FIG. 2 and which is operable to continue to move the machine element A in accordance with the commanded position signaled by the digital command number source 64.

In the system disclosed in the above-referenced application entitled "Readout System for Selective Display of Digital Data on Time-Shared Conductors," the digital adder 62 performs a large number of calculations on a regularly recurring basis, each type of calculation being assigned a particular time position in the recurring series of time periods of the adder, and following one of the program steps produced by the Central Timing System 101 (FIG. 4b). Thus, certain time periods of the adder are devoted to forming a corrected command number, and subsequent cycles of the adder are used to calculate the difference between the corrected position command number and the digitized position signal. To time the reading of these signals into the adder 62 from the Digital Command Number Source 64 and the digitizer 51, a Program Step Generator 79, driven by the timing and digital sweep circuits 35 is provided. The Program Step Generator 79 also produces timing pulses for timing the digitizer 51. In this connection, it will become apparent from a more detailed description of the numerical control system shown generally in FIG. 3 that the digitizer 51 is used not only to produce a digitized position of the movable machine element A along the X axis but that it is also used during other time periods which are interspersed with those during which X axis position is digitized to produce digitized position signals representing position of the movable machine element A along the Y axis and signaled by an additional resolver. It is to control the time-sharing operation of the digitizer 51 that programming signals are applied to it by the Program Step Generator 79.

To appreciate the relationship between the numerical control system generally described in FIG. 3 and the system of the present invention, shown generally in FIG. 1a, it should be noted that the latter system produces digitally signaled numbers used to compensate for peculiarities of different tools carried by the movable element A and which are utilized with a system of the type shown in FIG. 3 by being subtracted from the digitally signaled position command number (which has been corrected for other factors) produced by the Command Number Source 64.

THE NUMERICAL CONTROL SYSTEM IN DETAIL

The Central Timing System

Provision is made in the numerical control system for producing a digital sweep formed of signals which digitally represent a reference number repeatedly and cyclically changing from a first to a second predetermined value during successive time intervals. Provision is also made for timing a reference voltage and a quadrature voltage, used for powering X and Y axis position signaling resolvers, to occur at the same frequency of recurrence as that of the digital sweep. Finally, means are provided for producing signals which control the time periods during which output signals produced by the resolvers are converted into digital numbers. A particularly compact unit which has been used for performing all of these functions is the Central Timing System 101 shown in FIG. 4b.

*Producing the digital sweep.*—Forming part of the Central Timing System is a series of four cascaded binary coded decimal pulse counters 103, 105, 107, and 109. The digital sweep is derived from the outputs of the first three stages 103, 105, and 107 respectively labeled the A, B and C decade counters and collectively identified as the Digital Sweep Generator 102. The decade counters 103–109 are of similar construction and are well known to those skilled in the art. A typical unit of this type includes four cascaded flip flops interconnected so that the decade repeatedly counts from 0 to 9 in response to successive input pulses, being reset to 0 by every tenth input pulse and signaling its contents on four output lines, or terminals, in 8, 4, 2, 1 binary code. Additionally, each time the unit is reset to 0, it produces a signal on a fifth or "carry" line.

The A decade counter 103 is stepped by output pulses produced at a repetition frequency of 500 kilohertz by a Divide by 4 circuit 111 which in turn is driven by pulses from a 2 megahertz clock 113. The output pulses produced by the clock 113 and by the Divide by 4 circuit 111 are shown in FIG. 6 as the wave forms 115 and 117 respectively. The units digit of the digital sweep is signaled on output terminals of the A decade counter 103, labeled A1, A2, A4, and A8 to signify the binary weight of the signals appearing on the respective terminals. Since the pulse repetition frequency of the pulses applied to the A decade counter 103 is 500 kilohertz or a pulse every 2 microseconds, the A decade counter cycles through its ten count states every 20 microseconds. Through line 119, the "carry" output of the A decade counter 103 is applied to the input of the B decade counter 105 and consequently that counter cycles through its ten count states every 200 microseconds and on its four output terminals, labeled B1, B2, B4, and B8 is signaled the tens digit of the digital sweep. The carry output of the B decade counter 105 is applied to the input of the C decade counter 107 through line 121, causing that counter to cycle through its ten count states every 2 milliseconds. It is on the output terminals C1, C2, C4, and C8 of this counter that the binary coded decimal signals representing the hundreds digits of the digital sweep are derived.

Collectively, the decade counters 103, 105, and 107 produce a digital sweep formed of signals representing a reference number which repeatedly cycles during successive time intervals from a first predetermined value (here 000) to a second predetermined value (here 999) by uniform increments (here 1) and at uniformly time-spaced instances (here 2 microseconds). The signals produced by the Digital Sweep Generator 102 are applied to several parts of the system and in order to maintain clarity in the drawings, these connections are not indicated by lines. Instead the output terminals of the Digital Sweep Generator 102 contain the symbol Δ and terminals of devices elsewhere in the system which are connected to terminals of the Digital Sweep Generator contain similar symbols with an additional indication of the particular Digital Sweep Generator terminal to which they connected.

*Producing gating pulses to assure utilization of the digital sweep while its count states are stable.*—The progression of the reference number collectively signaled by the decade counters of the Digital Sweep Generator 102 is shown in FIG. 6 as the staircase shaped wave form 123. It will be seen that each new count state begins with the negative going edge of the wave form 117 and lasts until the next such negative going edge. The wavy line during the initial portion of each count state represents an instability period during which the counters are tumbling from their previous count states. It is the principal function of the Divide by 4 circuit 111 to produce a gating pulse which occurs during the central portion of the stable period of each count state so that units in the system which utilize the output of the Digital Sweep Generator may be gated open to receive the outputs of the Digital Sweep Generator during its stable count states.

The Divide by 4 circuit 111 includes two gated flip flops 125 and 127. The flip flop 125 has a pair of inputs J1 and K1 for receiving gating signals and a third input labeled CP for receiving clock pulses. The flip flop also has a pair of outputs labeled T1 and $\overline{T1}$ characterized by the fact that when a logic "1" level signal appears at one of the outputs, a logic "0" level signal is produced at the other. The flip flop 127 has inputs and outputs corresponding to those of flip flop 125 and are labeled J2, K2, CP, T2, and $\overline{T2}$. Flip flops of the type illustrated for use in the Divide by 4 circuit are commonly referred to as J–K flip flops and are well known to those skilled in the art. It will therefore suffice here to describe the manner in which they operate under four possible conditions.

Condition 1: if neither the J input nor the K input receives a logic 1 level signal, i.e., if neither J nor the K input is "qualified," while a clock pulse is applied to the flip flop, then the clock pulse does not change the state of the flip flop. Condition 2: if the K input is qualified during application of a clock pulse, the first clock pulse following qualification of the K input of the flip flop will reset it to its "0" state, in which state its T output produces a logic 0 level and its $\overline{T}$ output produces a logic 1 level. Condition 3: if the J input is qualified, application of a clock pulse will set the flip flop to its "1" state, that is, to that state in which its T output produces a logic 1 signal and its $\overline{T}$ output produces a logic 0 signal. With respect to the last two conditions, it will be understood that, if the flip flop is already in the 0 state when its K input is qualified it will simply stay in that state after a clock pulse is applied to it. Similarly, if the flip flop is already in the 1 state when its J input is qualified, it will simply stay in that state after receiving a clock pulse. Condition 4: if both the J and K inputs of the flip flop are qualified at the time when a clock pulse is applied to the flip flop, application of a clock pulse to the flip flop will cause it to reverse its state from whichever state it had been in prior to application of the clock pulse.

With this basic understanding of the J–K flip flops which form the Divide by 4 circuit 111, operation of the circuit can be simply described. It is the well-known switch tail or Johnson counter and is basically a two-stage serial shift register connected in a loop with the outputs cross-connected to the inputs. The T1 and $\overline{T1}$ inputs of flip flop 125 are connected to the J2 and K2 inputs of flip flop 127 respectively and the T2 and $\overline{T2}$ outputs of flip flop 127 are connected to the K1 and J1 inputs respectively of the flip flop 125. The clock pulse inputs of both flip flops 125 and 127 receive pulses from the 2 megaherz clock 113. Assuming that initially both flip flops are in the reset condition, logic 1 signals are applied by the $\overline{T1}$ and $\overline{T2}$ outputs of the flip flops to the K2 and J1 inputs of the two flip flops. This is indicated by the wave form diagrams shown to the right of the Divide by 4 circuit 111. Consequently, upon receiving the negative-going or switching edge of the first clock pulse, the first flip flop 125 becomes set but the second flip flop 127 remains in the reset condition.

With the flip flop 125 set, when the negative-going edge of the second clock pulse occurs, the T1 output of the flip flop 125 will be qualifying the J2 input of flip flop 127 while the $\overline{T2}$ output of flip flop 127 will continue to qualify the J1 input of flip flop 125 so that the negative-going edge of the second clock pulse will leave the flip flop 125 in the set state but will also cause the second flip flop 127 to switch from the reset to the set state. Thus, when the third clock pulse arrives, the $\overline{T1}$ and $\overline{T2}$ outputs of flip flops 125 and 127 will qualify the K2 and J1 inputs of flip flops 125 and 127. Since the K1 input of flip flop 125 and the J2 input of flip flop 127 are qualified when the trailing edge of the third clock pulse occurs, that trailing edge will cause flip flop 125 to be reset while leaving flip flop 127 in the set condition. This last change causes the $\overline{T1}$ output of flip flop 125 to qualify the K2 input of flip flop 127 and the T2 output of flip flop 127 to qualify the K1 input of flip flop 125. With this set of conditions existing, arrival of the trailing edge of the fourth clock pulse leaves the flip flop 125 in the reset condition but causes flip flop 127 to be reset from its previously set condition. This is the condition in which we originally found the two flip flops and from this point on, the cycle repeats.

The T2 pulse train, produced by the flip flop 127, is the one used to drive the Digital Sweep Generator 102, which is advanced by one count with each negative-going edge of the T2 wave form. Thus, the time which elapsed during the four clock pulses represents one count state of the Digital Sweep Generator 102. Specifically, the A decade counter 103 changes its count state on the trailing edge of the T2 pulse, delayed by the propagation delay of its flip flops. Decade counter 105 changes its count state, as signaled at its output terminals, on the trailing edge of the carry output of decade counter 103, delayed by the delays of the flip flops in counter 105. Thus the delays in successive counters 103–109 cumulate. The shaded area (FIG. 6) spanning the second, third, and fourth T2 clock pulses begins at the instant when the C decade counter 107 has stabilized and ends when the A decade counter 103 begins to change. Thus the shaded area represents the approximate time period during which all of the counters 103–107 of the Digital Sweep Generator 102 are in a stable state. The unshaded area, coinciding approximately with the first clock pulse T2 represents the brief time period during which some of the individual counters of the Digital Sweep Generator are tumbling to their new count states.

To produce a gating pulse which falls approximately during the mid-portion of the shaded area representing the stable state of the Digital Sweep Generator, the T1 output of flip flop 125 and the T2 output of flip flop 127 are applied to an AND gate 129 (FIG. 4b). From the wave forms related to the Divide by 4 circuit 111, it is seen that the T1 and T2 outputs of flips flops 125 and 127 are concurrently at a logic 1 level during the mid-portion of the shaded area so that during this time period a logic 1 or enabling voltage level appears at the output of AND gate 129. This signal is represented by the logical symbol T1·T2.

*Generating the program steps.*—The Central Timing System 101 also includes means for producing timing signals during different predetermined states of the Digital Sweep Generator so as to time the operation of various elements in relation to particular count states of the Digital Sweep Generator 102. The particular arrangement used here comprises a Program Step Generator 79 formed of the B and C decade counters 105 and 107 of the Digital Sweep Generator 102, and the D decade counter 109, the latter being driven by the carry output of the C decade counter 107. Just as the ABC decade counters 103, 105, and 107, when taken together, comprise a Divide by 1000 counter which cycles through a thousand different count states 500 times per second, so the BCD decade counters 105, 107, and 109, when taken together, comprise a Divide by 1000 counter which cycles through a thousand different count states 50 times per second. Stated differently, the count signaled by the ABC decade counters 103, 105, and 107, which comprise the Digital Sweep Generator 102, changes ten times for every change in the count signaled by the BCD decade counters 105, 107, and 109 which comprise the Program Step Generator 79.

The relationship just described is graphically illustrated in FIG. 6 wherein the wave form 135 illustrates the steps through which the Program Step Generator 79, formed of the BCD decade counters 105, 107, and 109, progresses. Each of these steps is a program step, and it is seen from the figure that, during the same period in which the program steps progress from 0 to 100, the Digital Sweep Generator goes through a complete cycle from 000 to 999.

The relationship between digital sweep numbers and program steps is also illustrated in FIG. 5. It shows a rectangular chart vertically divided into ten columns, each column divided into ten equal zones and each zone being further divided into ten equal steps. Thus the chart is divided into one thousand equal steps, and each step represents one count state of the Program Step Generator 79. The top step in the first column is labeled 000 and represents the intial count state of the Program Step Generator 79. The bottom or last step of the first column is labeled 99 and represents the 100th count state of the Program Step Generator. Steps in the remaining nine columns have a similar significance; thus, the top step of the second column represents count state number 101, the bottom step of that column the 200th count state, and so on through the entire chart until the last step of the last column, representing the 1000th count state of the Program Step Generator.

As pointed out earlier, for each step or count state of the Program Step Generator 79 the Digital Sweep Generator 102 goes through ten steps or count states of its own. Thus, during each 100 steps represented by successive columns of the programing chart, the Digital Sweep Generator cycles through a thousand different count states from 000 to 999 and this is indicated by the left-ward sloping line 123 which is an approximate representation of the count states of the Digital Sweep Generator 102.

Continuing with the consideration of the Program Step Generator 79, it is seen that it generates a series of 1000 potential program steps from which any step may be selected by means which are responsive to the particular set of signals existing on the outputs of the Program Step Generator during that step. This selection might be performed by devoting a separate set of AND gates to each program step that is to be selected. Obviously this would require quite a large number of such AND gates since each program step is signaled on twelve output terminals, B1–B8, C1–C8, and D1–D8. Consequently, to reduce the complexity of the equipment required to select various program steps for performance of differently timed functions, a series of three binary coded decimal to decimal code converters 141, 143, and 145 are provided for reducing the number of signals by which different program steps are represented. Each of the three code converters has four input terminals for receiving a binary coded decimal digit from one of the three decade counters of the Program Step Generator 79 and ten output terminals. The units converter 141 signals the units digit of the program step on one of ten terminals labeled 0 through 9; the tens converter 143 signals the tens digit of the program step on one of ten terminals labeled 00 through 90; and the hundreds converter 145 signals the hundreds digit of the program step on one of its ten outputs labeled 000 through 900.

Through the use of code converters, each of the 1000 program steps shown in the programing chart in FIG. 5 is represented by signals on a different combination of three output terminals among the thirty output terminals of the code converters 141, 143, and 145. As an example, assume that the Program Step Generator is in its count state number 746, or with reference to the programing chart of FIG. 6, in the 46th step of the eighth column. This count state and program step will be represented at the output terminals of the Program Step Generator 79 by logic 1 signals appearing on terminals A2 and A4, B4, and C1, C2, and C4. In contrast, this same count state and program step is represented at the outputs of the binary coded decimal to decimal converters 141, 143, and 145 by logic 1 signals on three output terminals: the 700 terminal of the hundreds converter 145, the 40 terminal of the tens converter 143, and the 6 terminal of the units converter 141. Thus, if it were desired to initiate operation of some part of the system during program step 746, it could be accomplished by use of means such as an AND gate responsive to concurrent signals on the three code converter output terminals just listed.

It may also be noted, that, for timing certain functions in the system during a given program step, the input signal which steps the B decade counter 105 is utilized. This signal marks the beginning of each program step, and is brought out at terminal 148 labeled PCP (for Program Clock Pulse).

*Synchronizing the resolvers.*—A third function performed by the Central Timing System is to provide synchronization for the means which produce the voltages used to drive the various position indicating synchronization devices used in the system. As stated in the description of the over-all system, the phase angle of the reference wave used to drive the synchronous devices relative to the cycling periods of the digital sweep which is produced by the Digital Sweep Generator 102 is optional so long as the phase angle remains constant. For purposes of this explanation, it is assumed that the reference voltage powering the synchronous devices is exactly in phase with the cycling periods of the digital sweep. By means of a flip flop 147, a square wave which is in phase with the cycling periods of the digital sweep is generated. The flip flop 147 may be of the same type as those described in connection with the Divide by 4 circuit 111 and it is so shown. To drive the flip flop 147 in phase with the digital sweep, the J input is connected to the C4 output of the C decade counter 107 and the "ANDed" C1 and C8 outputs of the same decade counter are applied by means of an AND gate 149 the K input of the flip flop. Finally, the clock pulse (CP) input of the flip flop is connected to the carry output line 121 of the B decade counter 105. Consequently, in accordance with the operation of the J–K flip flop as explained with reference to FIG. 8, the flip flop 147 is set every time the Digital Sweep Generator 102 changes from its 499th count state to its 500th count state and is reset every time the Digital Sweep Generator changes from its 999th count state to its 000 state. The desired square wave voltage appears at the Q output of the flip flop 147 and is shown in FIG. 5 as the wave form 150 to the immediate right of the programming chart.

Producing the position indicative phase variable analog signals

To provide an indication of the actual position of the cutting tool 82 along the respective axes, resolvers are provided for producing phase variable, recurring signals which indicate position along those axes. In a typical system of the type here described, several resolvers are provided to indicate position within successively finer ranges. For purposes of this description only those resolvers used to signal position within the finest range will be mentioned, and of these, only the X axis fine range resolver 27 will be described. It is shown in FIG. 4b and includes a stator with stator windings 151 and 153 associated with a rotor carrying a rotor winding 155. For this description it will be assumed that the resolver rotor is mechanically coupled through suitable gearing to the lead screw 83 so that, for each 0.1 inch of travel by the cutting tool 82 traversed by the saddle 78 along the X axis, the resolver rotor turns through 360°.

To excite the resolver, the 500 cycle per second square wave output 150 of the flip flop 147 is converted into a pair of 500 cycle per second sinusoidal voltages 90° out of phase with one another. The first winding 151 is energized by a reference voltage which is in phase with the square wave output 150 of the flip flop 147 and which appears in FIG. 5 to the right of the square wave as wave form 157. It is derived from the square wave 147 by means of a sine wave shaper 37a earlier referred to as part of the block 37 in FIG. 3. Such devices are well known to those skilled in the wave shaping art and will not be described here.

The second stator winding 153 is energized by a sine wave which lags by 90° behind the reference voltage wave 157 and is derived therefrom by a 90° phase shifter 37b again previously referred to in FIG. 3 as part of block 37. The phase shifter 37a is of a type, well known to those skilled in the art, which produces a sine wave which is of constant amplitude and whose phase is exactly 90° lagging relative to the sinusoidal applied to its input.

Capturing numbers signaled by the Digital Sweep Generator (the Digital Catcher)

*In general.*—In converting phase variable position indicative signals into digital numbers in accordance with the invention, means are provided for "capturing" or storing the signals appearing at the outputs of the Digital Sweep Generator at an instant when the phase variable signals reach a predetermined phase relative to the cycling intervals of the digital sweep produced by the generator. In a practical system of the type described, signals representing the instantaneous count state of the Digital Sweep Generator are captured in a series of Digital Catchers, each Digital Catcher receiving signals representing the instantaneous position within a particular range along different axes. In this description only one of these, that associated with the fine range resolver 27 is shown, and it appears in FIG. 4b.

Referring to FIG. 4b, through a common set of WRITE gates 55 a three stage register 53 receives the signals appearing on the output terminals A1–A8, B1–B8, and C1–C8 of the Digital Sweep Generator 102. In its A stage, the register 53 stores the units digit of the reference number forming the digital sweep; in its B stage the register stores the tens digit of the digital sweep; in its C stage the register stores the hundreds digit of the digital sweep. A set of READ gates 85 are provided for applying the signals stored in the register 53 to three trunk lines 91, 93, and 95, each having four individual conductors and respectively carrying the contents of the A, B, and C stages of the register 53.

To provide an indication of the instant when a phase variable, position indicative signal reaches a predetermined phase angle, here the instant when it crosses zero in a positive direction, a pair of squarer circuits 57 and 59 are provided for the X axis, and the Y axis signals respectively. These squarer circuits are individually connected to a pair of fine resolvers for the X and Y axes respectively. However, as stated previously, only one of these, resolver 27, is shown, and it will be understood that the Y axis squarer 59 is connected to a Y axis fine range resolver (not shown) in the same manner in which the X axis squarer is shown to be connected to the X axis fine range resolver 27.

The outputs of the X and Y axis squarer circuits 57 and 59 are gated through a pair of time share control AND gates 63 and 65 respectively and through an OR gate 69 collectively to the input 159 of the Reclocking Circuit 71. Each of the time-share control AND gates 63 and 65 has a control input terminal which when energized with a logic 1 signal opens the gate and causes the signal appearing at the output of its associated squarer circuit to be applied through the OR gate 69 to the input of the Fine Reclocking Circuit 71.

Timing signals suitable for opening the respective time-share control AND gates 63 and 65 for appropriate time periods are conveniently derived by means of digitize control flip flops 161 and 163 shown in FIG. 4c as forming the digitize control block 75. The Q output terminals of the flip flops are labeled with the symbol □ which corresponds to similar symbols appearing in the control terminals of the time-share control AND gates 63 and 65.

The output terminals of the digitize control flip flops 161 and 163, and the control input terminals of the time-share control AND gates 63 and 65 also bear reference numerals and it will be understood that each flip flop output terminal bearing a given reference numeral is connected to the time-share control AND gate input terminal which bears the same reference numeral. Thus it is seen from inspection of FIGS. 4b and 4c that the output terminals of the time-share control flip flops 161 and 163, respectively labeled 001–120 and 501–620, are connected to the identically labeled control input terminals of the time-share control AND gates 63 and 65, respectively.

Let it be assumed that initially the flip flop 161 is set, applying a logic 1 signal through its Q output terminal to the time-share control AND gate 63 so that the output of the X axis squarer 57 is applied to the input of the Reclocking Circuit 71. Let it be assumed further that the position of the cutting tool 82 along the X axis is such that the sine wave output of the resolver 27, applied to the X axis squarer 57 and shown in FIG. 6 as the wave form 167, crosses 0 in a positive direction during the twelfth count state of the Digital Sweep Generator, shown in FIG. 6 as the step 012 of the step ladder wave form 123. The instant at which the output signal produced by the resolver goes through 0 is a randomly occurring one, that is, it may occur at any time, its time of occurrence being a function only of the relative angular positions of the rotor and stator windings of the resolver. Thus, the zero crossing may occur during the time period in which the Digital Sweep Generator is in its stable count state or it may occur while the generator is in its unstable state during which it is tumbling to assume a new count state.

The X axis squarer 57 produces a logic "1" level voltage shown in FIG. 6 as wave form 169 at the instant of this positive-going zero crossing. If the output of the squarer circuit were applied directly to the WRITE gates 55, then every time the positive-going zero crossing of the sine wave occurred during the unstable period of the Digital Sweep Generator a spurious set of signals would be deposited in the register 53. It is to assure that this does not occur that the Reclocking Circuit 71 is provided. By means of this circuit, the output of the squarer 57 gated through the AND gate 63 and the OR gate 69 is delayed, or retimed, to occur during the following stable count state of the Digital Sweep Generator.

*The reclocking circuit.*—The reclocking circuit 71 includes a pair of flip flops 169 and 171 of the same type used in the Divide by 4 circuit 111. Thus the first flip flop 169 has a pair of inputs labeled J1 and K1 and a pair of outputs labeled Q1 and $\overline{Q1}$, while the second flip flop 171 has a pair of inputs labeled J2 and K2 and a pair of outputs labeled Q2 and $\overline{Q2}$. In addition each of the two flip flops has a clock pulse input labeled CP and both of the flip flops receive at their CP inputs the T2 output of the Divide by 4 circuit 111 through line 173. The two flip flops 169 and 171 are cascade connected, with the Q1 and $\overline{Q1}$ outputs of flip flop 169 being applied to the J2 and K2 inputs of flip flop 171 respectively.

Qualifying signals for the J1 and K1 inputs of the first flip flop 169 are derived from the input signal which is applied to the input terminal 159 of the reclocking circuit 71. The input signal is directly applied to the J1 input of the flip flop 169 and is inverted by means of an inverter 175 and then applied to the K1 input of the same flip flop.

So long as the squarer circuit 57 produces a logic 0 signal, that is, up to the instant when the sinusoidal voltage 167 applied to the squarer circuit 57 crosses zero in a positive direction, both of the flip flops 169 and 171 will remain in the reset condition. This follows, since a logic 1 voltage level will continue to be applied to the K1 input of flip flop 169 by the inverter 175 so that the first clock pulse received by the flip flop will reset it and all subsequent clock pulses will continue to leave it in the reset condition. With the flip flop 169 reset, a logic 1 voltage level is applied by its $\overline{Q1}$ output terminal to the K2 input of flip flop 171. Consequently if that flip flop is not already in the reset condition, it will be reset by the clock pulse following that which cause flip flop 169 to be reset and will remain in the reset condition from then on, so that, up to the instant when the output of resolver 27 crosses zero in a positive direction, the voltage level appearing at the Q1 output of flip flop 169 shown in FIG. 6 as wave form 177, remains at the logic 0 level, and the voltage at the $\overline{Q2}$ output of flip flop 171, shown in FIG. 6 as the wave form 179, remains at the logic 1 level.

These conditions continue until the output of resolver 27 crosses zero in a positive direction. When this occurs, the output of the squarer circuit 57 goes to a logic 1 level and this signal is applied through the time-sharing AND gate 63 and the OR gate 69 to the J1 input of flip flop 169. Consequently, upon occurrence of the next clock pulse following the positive-going zero crossing of the resolver's output signal, the flip flop 169 becomes set and its Q1 output goes to a logic 1 level. This is seen to occur in FIG. 6 with the trailing edge of the thirteenth clock pulse T2, which is the pulse applied to the clock pulse input of the flip flop 169. Although the Q1 output of the flip flop 169 is caused to go to the logic 1 level, this does not occur in time to cause the flip flop 171 to be set by the same clock pulse which had caused flip flop 169 to be set. Flip flop 171 remains reset until the trailing edge of the next T2 pulse is applied to its clock pulse input, which in FIG. 7 is shown as the fourteenth T2 pulse. It is this pulse which sets the flip flop 171, causing its $\overline{Q2}$ output to go to logic 0 level.

It will be noted that the trailing edge of the thirteenth T2 pulse represents the end of the eleventh count state of the Digital Sweep Generator 102, labeled 012 on the step ladder wave form 123 and that the trailing edge of the fourteenth clock pulse T2 represents the end of the twelfth count state of the sweep generator labeled 013 on the same wave form. Thus, in response to receiving a logic 1 voltage level commencing during the count state 012 of the Sweep Generator 102, the flip flops 169 and 171 produce a pair of wave forms 177 and 179 which are concurrently at the logic 1 voltage level during the count state 013, that is, the count state following that during which the input to the reclocking circuit went from logic 0 to logic 1 level.

To produce a signal which indicates the time period during which the wave forms 177 and 179 are at logic 1 level, an AND gate 181 is provided, with one of its inputs connected to the Q1 output of flip flop 169 and with its other input connected to the $\overline{Q2}$ output of flip flop 171 so that the output of the AND gate, shown in FIG. 6 as the wave form 182, is at the logic 1 level during the time period in which the Q1 and $\overline{Q2}$ outputs of flip flops 169 and 171 are at the logic 1 level, that is, during the count state following that in which the signal received by the reclocking circuit goes to the logic 1 level. Finally, to define a time period within that defined by the signal 182 produced by AND gate 181 during which the Digital Sweep Generator 102 is in its stable count state, a second AND gate 183 is provided, with one of its inputs receiving the output of AND gate 181 and with its second input receiving the T1·T2 signal produced by the AND gate 129 of the Divide by 4 circuit 111. This signal was discussed previously in connection with the Divide by 4 circuit 111 and is shown as the wave form 133 which has a logic 1 voltage level safely within the time period during which the digital sweep is in a stabilized count state.

Thus, in response to a logic 1 level input from the squarer 57a, the reclocking circuit 71 produces at its output, formed by the output of the AND gate 183, a logic 1 voltage level signal identified in FIG. 6 as the wave form 184 which coincides in time with the T1·T2 signal produced by the Divide by 4 circuit within the first stable count period of the Digital Sweep Generator following the count period during which the squarer signal is received.

From the foregoing, it is seen that, regardless of when the output of the X axis fine resolver 27a crosses zero in a positive direction the WRITE gates 55 to which the output of the Reclocking Circuit is applied will be opened during the first stabilized count state following that during which the zero crossing occurred. The Digital Catcher is therefore operative to capture in its storage register 53 a digitally signaled number from the Digital Sweep Generator 102 which is representative of the phase of the phase variable position representative signal produced by the X axis fine resolver 27 relative to the cycling intervals of the digital sweep.

*Time sharing the Digital Catcher.*—To derive digitally signaled numbers indicative of the phase variable signals representing position along the X axis and also along the Y axis, the Digital Catcher 51 is used during successive regularly recurring time periods to derive digitally signaled numbers from the Digital Sweep Generator 102 which represent the phase angles of the signals produced by the Y axis resolver (not shown).

The time periods during which the outputs of the X axis squarer 57 and the Y axis squarer 59 are applied to the reclocking circuit 71; i.e., the time periods during which the X and Y axes are digitized, are shown in the programming chart appearing in FIG. 5. The X axis resolvers are digitized during time periods which extend from program step 001, near the top of the first column, down to program step 120, a short distance below the top of the second column in the program chart, and digitizing of the Y axis resolvers begins during program step 501 and ends during program step 620. The duration of the digitizing periods are such that the resolver output goes through zero in a positive direction during each of them.

When it is recalled that the program steps of the programming chart are reiterated once every twenty milliseconds or fifty times a second, it is seen that the resolvers representing position along each of the X and Y axes are digitized during recurring time periods and, that the time periods during which respective ones of the X and Y resolvers are digitized succeed one another, so that, in all, the respective resolvers representing position along the X and Y axes are digitized during successive, periodically recurring, mutually interspersed time periods.

As explained previously, the time period during which the output of the X axis squarer 57 is applied to the reclocking circuit 71 is controlled by opening the timeshare control AND gate 63 for the desired time period. The control input of the AND gate 63 is connected to the Q output of the X axis digitize control flip-flop 161 in FIG. 4c. Therefore, to cause the outputs of the X axis squarer 57 to be applied to the reclocking circuit 71 for the desired time periods, the flip-flop 161 is set during program step 000 and is reset during the program step 120. This is achieved simply by a pair of program gates 185 and 187 whose outputs are connected to the J and K inputs of the flip-flop 161 respectively. Clocking pulses for switching the flip-flops 161 and 163 are derived from the PCP output terminal 148 of the Program Step Generator, and are applied to the CP inputs of the respective flip-flops.

Each of the program gates 185 and 187 is an AND gate having three inputs. Some of the inputs of the AND gates are marked with an X and with a number to the right of the input. These are connected to similarly labeled output terminals of the units, tens, and hundreds binary coded decimal to decimal converters 141, 143, and 145 of the Central Timing System. Others of the input terminals of the AND gates 185 and 187 are labeled with a "1" and these are connected to a source of logic 1 voltage level. Thus, two of the inputs to the program gate 185 are connected to a logic 1 voltage level and are always enabled. The third input to the AND gate is connected to the 000 output of the units BCD to D converter 141. Consequently, the program gate 185 produces a logic 1 signal which qualifies the J input of the flip-flop 161 during the program step 000 and the flip-flop is set by the next PCP pulse representing the commencement of the second program step 001. Similarly, the program gate 187 has one input connected to the one hundred output terminal of the BCD to D converter 145 and a second input connected to the 20 output of the tens BCD to D converter 143 while its third input terminal is connected to a source of logic 1 voltage level. Consequently a qualifying signal is applied by the program gate 187 to the K input of flip-flop 161 with the occurrence of the PCP pulse marking the commencement of the 121st program step 120.

Without going into similar detail with reference to the means for digitizing the Y axis, it will be noted that the time-share control AND gate 65 which controls digitizing of the Y axis resolver, has its control connected to the Y axis digitize control flip-flop 163. The latter flip-flop is clocked by the same PCP program clock pulse used to clock the X axis flip-flop 161, each such clock pulse occurring at the beginning program step. A pair of program gates 189 and 191 are connected to the J and K inputs of the Y axis flip-flop 163. Each of the latter two program gates has three inputs as did the first two program gates 185 and 187. By inspection of the signals which are applied to the program gates 189 and 191, it is seen that the flip-flop 163 is set at the beginning of the program step 501 and is reset at the end of program step 620.

Producing the command signals

In numerical control systems for machine tools, it is common practice to store either on magnetic tape or on punched paper tape information representing the desired motions of the controlled machine element. As illustrated in FIG. 4a, a tape reader 201 is arranged to read numerical information one block at a time from a punched tape 203 and to supply its output signals to a numerical contouring director 205. Multi-axis numerical contouring directors such as that represented at 205 are well known in the art and need not be described here in detail. It will suffice to note that the director functions to produce trains of command pulses on lines 207 and 209 for X and Y axes of movement. Such command pulses for a given axis each represent a given increment of commanded motion (e.g., .0001″), and thus by their total number and frequency represent a desired extent of movement and a desired velocity of movement along that axis. By coordinating the number and frequency of command pulses for the X and Y axes, the axis component distances and velocities will result in a combined motion of a desired extent and at a desired angle in space.

The director 205 also receives sign information from the tape reader 201 and it indicates on line 210 whether the motions directed on the X and Y lines 207 and 209 are to be in a positive or a negative direction (+X to the right and −X to the left, +Y up and −Y down as illustrated adjacent the turret A in FIG. 2).

The command pulses on lines 207 and 209 are serially spaced in time. They are converted into a digitally signaled command number which changes at a rate proportional to the command pulse frequency by means of a pair of accumulating reversible counters 211 and 213 labeled XP and YP respectively. These counters 211 and 213 may be of identical construction. Referring to the XP reversible counter 211, it has six cascaded decades, for storing the units, tens, $10^4$, and $10^5$ digits of a number respectively. The counter is also provided with a terminal 215 receiving a +/− signal via line 210 which determines whether the counter counts up or counts down.

Formed of four cascaded flip flops interconnected by appropriate gates, each decade signals its stored digit on four output lines in binary coded decimal notation. Such counting units are well known in the art and need not be described in detail. It is assumed that each decade signals the decimal digit "count" stored in it in the 8–4–2–1 code. According to this code, signals appearing on the four output lines of each decade are respectively assigned a weight of 8, 4, 2, and 1 and decimal numbers from 1 to 9 are represented by signals appearing on one or more lines whose total weight equals the signaled number. Of course, other binary decimal codes may be used and the 8–4–2–1 code here described is merely exemplary.

With a count-up or + signal on terminal 215, each input pulse adds one to the number signaled at the output lines of the units decade counter 211–0. Upon every tenth input pulse, the units decade counter 211–0 feeds one pulse to the tens decade counter 211–2 and upon every hundredth input pulse, the tens decade counter 211–2 steps the hundreds decade counter by one. A similar rule of operation is followed by all of the higher decade counter stages.

To reverse the operation of the reversible counter 211, its control terminal 215 is energized with a − signal via line 210, causing the counter to diminish the number signaled at its output terminals by one for each pulse fed to its input.

The YP reversible counter 213 is similarly arranged, producing on a set of output lines a digitally signaled command number which changes at a rate proportional to the Y axis command pulse frequency on line 209 in a sense determined by the signals on the line 210.

The parallel adder, a brief description

It is the general scheme of the numerical control system periodically to apply the command signals produced by the XP and YP reversible counters to a parallel adder, to apply other signals to the adder representing corrections to be made to the command signals, to add or subtract the corrections signals from the command signals, and to apply the result to the X and Y servoloops. The parallel adder used for this purpose is indicated at 62 (FIG. 4a) and is shown as having ten decades and a stage for sign information.

An appropriate parallel adder is described fully in the above referenced application for Readout System for Selective Display of Digital Data on Time-Shared Conductors. It is sufficient to note here that each decade of the adder 62 includes four input terminals 217 and four output terminals 219 and that each decade also includes means for adding or subtracting digits of numbers applied to its input terminals in the form of binary coded decimal signals. Further, a carry from each of the first nine decades to the next higher decade is provided so that collectively the adder 62 will produce at its output terminals a number signaled in binary coded decimal form which is the sum of numbers similarly signaled in succession at its input terminal 217. An additional stage having a single input terminal and a single output terminal is provided for receiving and producing sign information. In all, therefore, the exemparly parallel adder 62 has 41 input terminals and the same number of output terminals.

Furthermore, the adder 62 is divided into a series of adder stages 221 and a corresponding series of accumulator stages 223. Each accumulator stage 223 receives as one of its inputs the output of its associated adder stage 221, and in turn the output of each accumulator stage 223 is connected (through a set of gates not shown in FIG. 4a) to the input of its associated adder stage 221. As each successive digit is applied to the adder stage 221, that digit is added, during the following time period, to the sum accumulated in the accumulator 223. Thus, considering the entire adder 62, with each successive number signaled at the adder input terminals 217, a new subtotal is formed one time period later at the outputs of the registers 223 whose outputs comprise the adder output terminals 219.

The adder 62 will continue to accumulate numbers signaled at its input terminals until a Clear Adder signal is applied to all of the accumulator stages. As described more fully in the referenced application for a Readout System, the Clear Adder signal opens the gates which are between the outputs of the accumulator stages 223 and the inputs of the adder stages 221. Application of a Clear Adder signal thus disrupts the application of accumulated signals to the adder stages so that when the next number is signaled at the adder input terminals, it is that number alone which will be registered in the accumulator stages.

The adder 62 is also capable of substracting a number signaled on the input terminals from a number previously accumulated in its accumulator stages. Operation of the adder in this mode is brought about by applying a signal to its FORCE SUBTRACT terminal 225 shortly after the number which is to be subtracted has been applied at its input terminals 217.

To apply signals to the input terminals of the adder 61 a common input trunk 227 is provided. The adder input trunk has one conductor for each adder input terminal 217. In similar manner, a common output trunk 229 is provided to apply signals produced by the adder on its output terminals 219 to various utilization devices in the system and in particular to the X axis servomechanism 90, of which the X axis servomotor 92 shown in FIG. 2 is a part.

Producing the signals for driving the servomechanism

To transfer the contents of the XP and YP registers 211 and 213 to the adder 62 during appropriate program steps, the digitally signaled command number on the output of the XP reversible counter 211 is applied to the adder input trunk 227 by a set of read gates 233 at time periods determined by a gating signal applied to the read gates on their timing input line 235 by a programming gate 237. The command signals produced by the YP reversible counter are similarly applied to the adder input trunk by a second set of read gates 239 under the control of a gating pulse applied to their timing line 241 by a second program gate 243. The particular program steps when these transfers occur are of no importance here, and the particular outputs of the program step generator 79 to which the program gates 237 and 243 are connected are not shown. It is sufficient to note that, following transfer of the contents of each of the registers XP and YP 211 and 213 into the adder 62, there are successively applied to the adder a series of correction numbers produced by a plurality of digital correction number sources which are not shown in FIG. 4, but which appear in FIG. 3 as the block 64b In a typical sequence, the correction number which is produced by the system incorporating the present invention is subtracted following subtraction of the aforementioned correction numbers from the digitally signaled command number taken from the XP and YP registers.

After the correction numbers have been subtracted from the digitally signaled command number, then the number representing actual position of the tool positioned for work in the turret A is subtracted by the adder 62 from the corrected command number and the remainder representing the error between actual and desired positions, is applied through the adder output trunk (AOT) 229 to the servomechanism 90 (FIG. 4b) used to position the turret head A along the X axis.

As described in a previous section, the digitally signaled number representing actual position of the turret A is stored in the Digital Catcher 51. To cause this number to be subtracted from the corrected command number, the Digital Catcher 51 includes a set of READ gates 85 formed of a plurality of AND gates (not shown), one for each output line of the register 53 of the Digital Catcher. The outputs of the READ gates 85 are connected to the AIT trunk line 227 and cause the number stored in the register 53 to be applied to the addend inputs of the adder 62 whenever the READ gates are opened. For this purpose, a pair of programming gates 249 and 251 are associated with the READ gates 85 and apply programing pulses during appropriate program steps so as to cause the position representative digital number stored in the register 53 to be applied to the addend inputs of the adder 62 during the adder cycle following that in which the corrected command number is stored therein. To apply the outputs of the program gates 249 and 251 to the READ gates 85 an OR gate 253 is provided. Again, the particular program step during which the last mentioned subtraction is performed by the adder 62 is not of interest here, and therefore the particular output terminals of the program step generator 79 to which the program gates 249 and 251 are connected are not identified in FIG. 4b. Suffice it to say that, at the end of the adder cycle in which the actual position number derived from the Digital Catcher 51 is subtracted from the corrected command number, a digitally signaled error signal is applied to the servomechanism 90.

A SYSTEM INCORPORATING FEATURES OF THE INVENTION—IN DETAIL

A numerical machine control has been described for a machine tool carrying five cutting tools in a turret positioned along X and Y axes by the system. It was seen that a given position command number, even after it has been corrected for certain factors, will still cause various tools in the turret to be positioned differently, due to their individual dimensional characteristics and that a digitally signaled trimming number should be produced for each tool which, when subtracted from the previously corrected command number will bring about correct positioning of each of them along the X and Y axes.

In accordance with a specific feature of the invention, a system is provided for producing and selectively displaying a pair of trimming numbers, one for correcting for X axis dimensional variation and the other for correcting the Y axis dimensional variation for each of the five tools in the turret A of the exemplary machine tool shown in FIG. 2.

The trimming potentiometer array

As seen in FIG. 7b, an array of two banks of trimming potentiometers XTR1 through XTR5 and YTR1 through YTR5 are energized over a pair of supply lines 13 and 15 by two sinusoidal voltages 90° out of phase with one another, as described earlier with reference to FIG. 1a. Means are provided to bring out on a pair of output lines 59X and 59Y the outputs appearing on the sliders of any pair of XTR and YTR potentiometers, respective potentiometer pairs being provided for supplying trimming signals for respective ones of the five tools in the turrent A, and to do this automatically as the respective tools in the turret are indexed into working position. To this end, the first pair of potentiometers XTR1 and YTR1 receive energizing voltages under control of a control relay TR1 which also carries contacts for connecting the sliders of the potentiometers XTR1 and YTR1 to the output lines 59X and 59Y respectively. Successive pairs of potentiometers XTR2–YTR2 through XTR5–YTR5 are similarly controlled by the relays TR2 through TR5, the latter four relays having contacts connected to their associated potentiometer pairs in a manner identical to that in which the contacts of the relay TR1 are connected to its associated potentiometer pair XTR1 and YTR1. Accordingly, it will be understood that the following description of the manner in which the XTR1 and YTR1 potentiometers are energized and controlled by the relay TR1 applies equally to the other four pairs of potentiometers as well.

The bottom extremity of the trimming potentiometer XTR1 is connected to line 13 and receives a reference sinusoidal voltage thereon. The top extremity of the potentiometer receives a quadrature sinusoidal voltage from the bus line 15 to which it is connected through contact TR12. The relay TR1 has only one normally closed contact which will be so identified. Unless otherwise indicated, all contacts in the following description will be understood to be normally open.

The slider of the trimming potentiometer XTR1 is connected to the output line 59X through contact TR13 of the relay TR1. So long as none of the relays TR1 through TR5 are energized, no signals appear on the output lines 59X and 59Y. As a particular relay is energized, the pair of trimming potentiometers controlled by its contacts apply a pair of sinusoidal voltages to the lines 59X and 59Y with the phases of these voltages being determined by the settings of the sliders on the potentiometers as described previously with reference to FIGS. 1a–1c.

The bottom terminals of the relays TR1 through TR5 are connected to a source of positive voltage by a common bus line 281. The opposite terminal of each of the relays is connected to a relay driver 283, relay drivers associated with the respective ones of the relays TR1 through TR5 being individually identified as 283–1 through 283–5.

Selecting a pair of trimming signals

In accordance with a feature of the invention, as successive tools in the turret A are indexed into working position by data derived from the tape reader 201, the relay drivers 283 are successively energized so as to cause the X and Y trimming voltages required for the particular tool which has been indexed, to appear on the output lines 59X and 59Y. As shown in FIG. 7a, data from the tape reader is applied to a Decode and Data Routing Circuit 285. Among the data is a data block which instructs the machine tool to index the next tool into position. Also on the tape is the number of that tool. At an appropriate time in the operation of the numerical control system, the contents of the Decode and Data Routing block 285 are transferred into a buffer register 287, this being timed by a store enable pulse produced by the Decode and Data Routing block 285. When the data block in which the number of the tool to be indexed has ended an "End of Block" signal is applied to a set of dump gates 289 at which time the contents of the buffer register are transferred by the dump gates into an active register 291.

The information identifying the particular tool to be indexed into working position thus far has been in binary code, and appears in that form at the outputs of the active register 291. To energize an appropriate one of the five relay drivers 283–1 to 283–5, the binarily signaled tool number appearing at the outputs of the active register 291 (and which in the exemplary system is one of the numbers 1 through 5) is applied to a binary coded decimal to decimal (BCD to D) converter 293 so that by the time the desired tool has been indexed into working position, the appropriate one of the control relays TR1 through TR5 is energized and the trimming signals required for that tool appear at the output lines 59X and 59Y.

In addition to the foregoing means whereby the outputs of successive pairs of X and Y trimming potentiometers may be caused to appear on a pair of output lines 59X and 59Y automatically as each of five tools in a turret is indexed into working position, means are also provided for permitting an operator to cause signals appearing on any of the five pairs of potentiometers to appear on a second pair of lines 60X and 60Y for selective display by the readouts 70a and 70b (FIG. 4a). For this purpose a second series of relays M1 through M5 are provided for causing the trimming potentiometer pairs XTR1–YTR1, through XTR5–YTR5 respectively to apply a pair of trimming signals to the output lines 60X and 60Y.

With reference to the first pair of trimming potentiometers XTR1 and YTR1, the upper extremity of XTR1 is connected to the quadrature voltage line 13 through contact M12 of the relay M1, and the slider of the same potentiometer is connected to the output line 60X through contact M13 of the same relay so that when the relay M1 pulls in, a pair of phase variable sinusoidal voltages appear on the output lines 60X and 60Y with their respective phases controllable by the settings of the potentiometers XTR1 and YTR1 respectively. To cause the relay M1 to pull in, it is connected across a source of D.C. voltage which is carried on bus lines 303 and 305 through normally closed contact TR16 of the control relay TR1 and through a normally open push button switch 307–1. Consequently, provided that the trimming potentiometers XTR1 and YTR1 are not being used to supply trimming signals over the lines 59X and 59Y, the output signals of these potentiometers may be put on the lines 60X and 60Y by depressing the push button switch 307–1. The remaining four pairs XTR2–YTR2 through XTR5–YTR5 are similarly controlled by relays M2 through M5 energized from the bus lines 303 and 305 through push button switches 307–2 through 307–5 respectively. As a result, the trimming signals for which any particular pair of trimming potentiometers is set may be displayed by depressing the particular push button switch 307 associated with that pair of potentiometers so long as the outputs of the pair are not then being used for trimming purposes.

The reference sinusoidal voltage and the quadrature sinusoidal voltage which appear on the supply lines 13 and 15 and which are used in accordance with the invention to energize all of the potentiometers are derived from the Digital Sweep Generator 102 (FIG. 4b) by means of a J-K flip flop shown in FIG 7a and earlier described in section H–1(b). The clock pulse (CP) input of the flip flop 309 is connected to the Digital Sweep Generator 102 "B" decade counter 105 carry output line 121, receiving a carry signal at the beginning of each of the count states 000, 100, 200, ... 900 of the Digital Sweep Generator. The K input of the flip flop is qualified just before the Digital Sweep Generator 102 signals 300, by means of a program gate 311 having one input connected to a logic 1 voltage level and two inputs respectively connected to the C2 and $\overline{C4}$ outputs of the Digital Sweep Generator 102. The J input of the flip flop 309 is qualified just prior to count 800 of the Digital Sweep Generator 102 by means of a program gate 313 having three inputs respectively connected to the C1, C2, and C4 outputs of the Digital Sweep Generator. Consequently, the flip flop 309 is reset by the "B" decade carry signal marking the beginning of count state 300 of the Digital Sweep Generator and the flip flop is reset by the "B" decade carry signal marking the beginning of the 800th count state of the Sweep Generator.

The voltage appearing at the Q output of the flip flop 309 is illustrated as the wave form 315 appearing to the right of the programming chart in FIG. 5. It is seen to be a 500 c.p.s. square wave changing from a logic 1 voltage level to a logic 0 voltage at the start of program steps 30, 130, 230 ... 930 and changing back from a logic 0 level to a logic 1 level at the beginning of program steps 80, 180, 280 ... 980. The reason for this choice of phasing will appear very shortly.

The reference sinusoidal voltage which appears on supply line 13 is derived from the square wave output of the flip flop 309 by means of a sine wave shaper 38, previously identified in the general block diagram of FIG. 1a. It is shown in FIG. 5 as the sine wave 317, and is seen there to be in phase with the reference square wave 315.

The quadrature sinusoidal voltage supplied over line 15 to the trimming potentiometers is in turn derived from the reference phase output 317 of the sine wave shaper 38 by means of a 90° phase lead circuit 40 also identified in the general block diagram of FIG. 1a with the same reference numeral. The 90° phase lead circuit 40 produces a sinusoidal voltage which leads the input voltage applied to it by 90° as shown by the wave form 319 in FIG. 5. Circuits for producing a sinusoidal voltage having a 90° phase lead relative to the phase of the sinusoidal voltage applied to the circuit are well known to those skilled in the art. A typical circuit of this type would include an operational amplifier with resistive input and capacitive feedback. To obtain proper balance between the amplitudes of the reference and quadrature sinusoidal voltages 317 and 319, a small adjustable resistor would preferably be applied in series with the input so as to cause the two sinusoidal voltages to have the same amplitude.

To appreciate the reason for the particular phasing of the reference square wave 315 relative to the cycling intervals of the Digital Sweep Generator, reference should be made to the band of program steps during which the Digital Catcher 51 is digitizing and the adder 62 is computing. Referring to the programing chart in FIG. 5, it is seen that the digitizing of the X axis, performed by the Digital Catcher 51 in combination with the Digital Sweep Generator 102, takes place during program steps 001–120. During the next band of program steps, down to program step 141, the adder performs certain computations involving the number produced by the Digital Catcher 51. These computations are of no interest here and are mentioned only to indicate the unavailability of the adder 62 during these band of program steps. Similarly, the Digital Catcher 51 in combination with the Digital Sweep Generator 102 digitizes the Y axis position signal produced by another resolver (not shown) during the band of program steps 501–620 and the number produced in the Digital Catcher is processed by the adder during the program steps 621–641 so that during the program steps 501–641 either the digitizing system or the adder 62 is unavailable.

The digitizing system, comprising the Digital Catcher 51 and the Digital Sweep Generator 102, do become available during the period including program steps 142 through 199, 242 through 299, 642 through 699, and 742 through 799. Other periods are also blank on the programing chart but the foregoing ones will be the ones utilized and of particular interest.

Referring to the pair of sine waves 317 and 319 to the right of the programing chart, it is seen that with the particular phasing which was produced by the reference square wave generating flip flop 309, the quadrature phase 319 crosses zero in a positive direction at count 550 of the digital sweep, corresponding to the beginning of the 56th program step in each column of the ten columns of program steps shown in the programing chart, i.e., program steps 55, 155, 255 . . . 955. The reference wave 317 is the second to cross zero in a positive direction and does so when the number produced by the Digital Sweep Generator reaches 800, corresponding to program steps 80, 180, 280 . . . 980 in the program chart. It was earlier explained with reference to the vector diagram in FIG. 1c that as the slider of the potentiometer energized by a pair of sinusoidal voltages out of phase by 90° is swept across its range of travel, the phase which appears at the slider will go from the phase of one of the sinusoidal voltages to the phase of the other. Consequently, the sliders of the trimming potentiometers in FIG. 7b energized by the sinusoidal voltages 317 and 319 will produce a phase variable sinusoidal voltage whose zero crossing will occur at the earliest at count state 550 and at the latest at count state 800 of the Digital Sweep Generator 102. This is indicated in FIG. 5 as the range of zero crossing adjustment. This is seen to be safely within the range of program steps available for digitizing the phase variable voltages produced by the trimming potentiometers.

It will be realized therefore that if the band of program steps during which the equipment became available for digitizing operations were changed, the phase of the reference square wave 315 would be changed accordingly by connecting the inputs of the program gates 311 and 313 of the reference square wave generating flip flop 309 to different ones of the Digital Sweep Generator output terminals so as to produce a 500 cycle reference square wave whose phase relative to the cycling periods of the Sweep Generator 102 is such as to accommodate the time periods which are available for digitizing the potentiometer outputs.

Digitizing the trimming signals

In carrying out the invention, the phase variable trimming signals produced by the selected pair of XTR and YTR potentiometers are applied to the digitizer comprising the Digital Catcher 51 and the Digital Sweep Generator 102 of FIG. 4b, during successive periodically recurring periods in which those devices are not performing other functions. In particular, the output of the selected XTR potentiometer is applied (after being converted into a square wave by the XTR squarer 321) to the input of the reclocking circuit 71 of the Digital Catcher 51 during a time period extending from program step 151 to and including program step 190, and the output of the selected YTR potentiometer is applied (after being converted into a square wave by the YTR squarer 323) to the input of the reclocking circuit during program steps 651–690 inclusive. The foregoing time periods are identified on the programing chart of FIG. 5 as the "Digitize Trim Pot X Axis" and "Digitize Trim Pot Y Axis" respectively. The manner in which the sinusoidal voltages which are applied during the successive digitizing periods to the Digital Catcher 51 are converted into digitally signaled numbers is the same as described previously in section H–3 in connection with digitizing of the resolvers, and need not be repeated here. It is sufficient to note that the digitizing periods are sufficiently long to insure that, regardless of where the slider of a potentiometer is positioned, the positive-going zero crossing of the signal appearing on it will occur during the digitizing periods. Thus, the total time band over which a positive-going zero crossing could possibly occur in the exemplary embodiment covers 25 program steps. The time band devoted to digitizing these signals is 40 program steps long and extends both before and after the time periods during which positive-going zero crossing can occur.

The square wave outputs of the XTR and YTR squarers 321 and 323 are applied during the time periods just described under the control of a digitize control block 325 (FIG. 7a) similar to the digitize control 75 shown in FIG. 4c for timing the digitizing of resolver outputs.

The outputs of the digitize control are timed to coincide with the band of program steps during which the output of a particular squarer is to be applied to the Digital Catcher 51, and in particular to its reclocking circuit 71, and these timing pulses are applied to time share control AND gates 327 and 329 associated with XTR and YTR squarers 321 and 323 respectively. The output of the XTR squarer 321 is applied to one input of the time share control AND gates 327. At a second input the AND gate 327 receives, over a line 333, a gating voltage produced at the Q output of flip flop 331 of the digitize control 325. The J input of the flip flop 331 is qualified during program step 150 by a program gate 332 having one input connected to a logic 1 voltage level and two inputs connected to the 100 and to the 50 outputs of the Program Step Generator 79. The CP input terminal of the flip flop 331 receives PCP pulses from the Central Timing System 101 so that the flip flop becomes set and applies a logic 1 voltage level over line 333 to the AND gate 327 with the beginning of program step 151.

The K input of the flip flop 331 is qualified by a signal from program gate 335 having two inputs connected to the 100 and to the 90 outputs of the Program Step Generator 79 and a third input connected to a logic 1 voltage level. Accordingly, the flip flop becomes reset and terminates the logic 1 voltage levels theretofore applied by it over the line 333 at the end of program step 190.

To prevent mere electrical "noise" from being applied to the digitizing system it is desirable that in the absence of a signal on the output of the squarer 321, the program gate 327 be positively disabled, and for this reason it is provided with a third input which must be enabled if the gate is to be opened. This third input of the AND gate 327 is connected to a line 337 upon which a logic 1 voltage level appears only when at least one pair of the XTR and YTR trimming potentiometers is under instructions to apply a pair of trimming signals to the output lines 59X and 59Y. To produce the appropriate signal on the line 337, labeled the TRIM line, the BCD to D converter 293 (FIG. 7a) applied a logic 0 voltage level over a sixth output line 339 to an inverter 341 concurrently with the appearance of a signal on any one of its five output lines 1 through 5. Thus, only when one of the control relays TR1 through TR5 is energized and causes a trimming signal to be applied to the XTR squarer 321, is the AND gate 327 permitted to apply whatever signal appears at the output of the squarer 321 during the X axis digitizing period 151–190.

The digitizing period during which the output of the YTR squarer 323 is permitted to pass through the AND gate 329 is determined by a second flip flop 343 in the digitize control 325. The flip flop 343 is identical with the flip flop 331 and its J, K, and CP input terminals are qualified and pulsed in the same manner as those of the flip flop 331. The program gates by which the qualifying signals are derived from the Program Step Generator 79 are shown in FIG 7a and it will be apparent on inspection that the flip flop 343 is set during program step 651 and is reset during program step 690, applying a logic 1 voltage level during these program steps over a digitize control line 345 to one of the three inputs of the time share control AND gate 329. The third input terminal of the AND gate 329 is connected to the TRIM line 337 and, provided a logic 1 voltage level appears on that line, the output of the squarer 323 will appear at the output of the time share control AND gate 329 during the Y axis digitize time period 651–690.

To apply the outputs of the time share control AND gates 327 and 329 to the input of the Digital Catcher reclocking circuit 71 an OR gate 347 is provided with two of its inputs receiving the outputs of the AND gates 327 and 329 and with its output being connected to the input of the Digital Catcher reclocking circuit 71 through the OR gate 69.

Monitoring the trimming potentiometers

In the foregoing section, there was described the means whereby the outputs of the particular two XTR and YTR trimming potentiometers which have been selected are applied to the Digital Catcher 51 and are converted into digitally signaled numbers during the X and Y trim pot digitizing program steps 151–190 and 651–690. Provision is also made for digitizing the outputs of a second pair of XTR and YTR potentiometers which may include any of the five pairs of potentiometers so long as that pair is not then being used to supply trimming signals to the system over line 59X and 59Y. To this end, a second pair of squarers 349 and 351, labeled "Squarer XTM" and "Squarer YTM" respectively, are provided. The XTM squarer 349 receives the signal appearing on the trimming potentiometer output line 60X and the YTM squarer 351 receives the trimming signal produced on the output line 60Y. It will be recalled that the signals which appear on these lines are determined by the particular one of the five push button switches 307–1 to 307–5 available to the operator. Assume, for example, that tool No. 2 is indexed into working position and that therefore the trimming potentiometers XTR2 and YTR2 are supplying trimming signals over the output lines 59X and 59Y. This is indicated by one of a bank of lamps 353–1 through 353–5, respectively associated with the relays TR1 through TR5. Each of the five lamps is energized from a lamp voltage supply appearing on bus lines 355 and 357 through a contact of its associated TR relay. Thus, the lamp 353–1 is energized through relay contact TR11, lamp 353–2 through relay contact TR21, and so on. Thus the operator is apprised that the potentiometers XTR2 and YTR2 are in use.

Assume also that the operator wishes to set potentiometers XTR4 and YTR4. He depresses the push button switch 307–4 and causes the selected potentiometers to be energized and to apply their outputs over the lines 60X and 60Y to the XTM and YTM squarers 349 and 351 respectively. In turn the squarers apply their respective outputs, which are square waves in phase with the sinusoidal voltages applied to their inputs, to a pair of time share control AND gates 359 and 361 respectively. AND gate 359 receives a digitize control signal over line 363 of the digitize control 325 during program steps 251–290. Over a fourth line 367 the time share control AND gate 361, associated with the YTM squarer 351, receives a digtize control signal during program steps 751–790. To produce the digitize control signals, which appear on the lines 345 and 367 during program steps 251-290 and 751–790 respectively, a second pair of flip flops 365 and 369 are provided in the digtize control 325.

The flip flops 365 and 369 are the same type and are controlled in the same manner as the first two flip flops described with reference to the digitize control 325. All the necessary program gates and their connections to the Program Step Generator 79 are fully shown in FIG. 7a and need not be described here. Mere inspection of these connections will show that the flip flops are operative to produce the timing signals required of them.

Previously it was stated that it is desirable positively to prevent noise which may be present at the inputs of the time share control AND gates 327 and 329 (associated with the XTR and YTR squarers 321 and 323) from being applied through the OR gate 347 to the Digital Catcher 51. It is similarly desirable to prevent noise which may exist at the inputs of the time share control AND gates 359 and 361 from being applied to the Digital Catcher 51, in the absence of an output from their associated squarers 349 and 351. For this reason, each of these AND gates is provided with a third input which must be enabled in order for the outputs of the squarers 349 and 351 to be passed through. The third inputs of the AND gates 359 and 361 are enabled over a MONITOR line 373 upon which a logic 1 voltage level appears only when a pair of signals actually appear at the outputs of the squarers XTM and YTM 349 and 351. To this end, the relays M1 through M5 are provided with an additional contact M11 through M51 respectively. The contacts M11 through M51 are connected in parallel between ground and a source of positive voltage through a resistor 375 so that, if any of the relays is energized, a logic 0 voltage level appears at the junction point of the contacts and the resistor 375. This voltage is applied to a signal converter 377 which operates as an inverter to change the logic 0 voltage level to a logic 1 voltage level. The monitor line 373 is connected to the output of the signal changing device 377 and therefore is operative to apply a logic 1 enabling voltage to the AND gates 359 and 361 only if the XTM and YTM squarers are receiving signals for display.

The outputs of the time share control AND gates 359 and 361, respectively carry the signals produced by the XTM and YTM squarers 349 and 351 during the monitor digitize time periods are applied to third and fourth inputs of the OR gate 347 and through the OR gate to the Digital Catcher 51, wherein they are converted into digitally signaled numbers. In a manner to be described, these monitored numbers are first modified and then displayed to permit the operator to "dial" on the monitored XTR and YTR potentiometers the numbers he wishes those potentiometers to produce when their associated tool is indexed.

Summing up, phase variable logic signals appear at the output of the OR gate 347 and are applied to the Digital Catcher 51 during the digitize trim pot X axis program steps 151–190 and during the digitize trim pot Y axis program step 651–690 respectively, provided a logic 1 voltage level appears on the TRIM line 337, i.e., provided the system has received an instruction from the tape reader 201 to produce a pair of trimming signals. Similarly, there appear at the output of the OR gate 347 and are applied to the Digital Catcher 51, a second pair of phase variable logic signals during the monitor trim pot X axis program steps 251–290 and during the monitor trim pot Y axis program steps 751–790 respectively, provided a logic 1 voltage level appears on the monitor line 373, i.e., provided the operator has depressed one of the push button switches 307–1 through 307–5.

Producing a corrective constant

The range of zero crossing adjustment which is available from the trimming potentiometers was shown previously to fall between the instant when the Digital Sweep Generator signals 550 and the instant when it signals 800. It was seen that this was necessary because of the time periods remaining available for digitizing the signals produced by the trimming potentiometers. With such a range of zero crossing adjustment, the numbers produced as a result of adjusting the trimming potentiometers will always fall between 550 and 800 or, more precisely, between 551 and 881 because of the one count delay introduced by the Relocking Circuit 71 (see H–3–b last paragraph).

In certain applications of the invention, it will be desirable that the trimming number which is produced in response to the settings of the potentiometers be variable over a range which centers at 0 and which goes from a negative number, when the slider is at one extremity of the trimming potentiometer, to a positive number, when the slider is at the opposite extremity of the potentiometer. In the present embodiment, the total range of numbers produced by the Digital Catcher 51 in response to signals applied to it from a trimming potentiometer is 250, which represents in the present case a range of +.0550 inch to +.0800 inch of correction. One way in which this range may be shifted so as to center about 0 is to subtract from the digitized output of the trimming potentiometer a number which is half of the sum of the lowest and highest number produced as the trimming potentiometer is transversed across its full range of travel. This number, referred to as a Corrective Constant, is —675 corresponding to a correction of —.0675 inch. Means for subtracting the corrective constant from the digitized trimming signals is shown in FIG 8 and includes a set of READ gates 66 so connected permanently as to apply, when they are enabled, a logic 1 voltage level to those lines of the Adder Input Trunk 227 which carry the 1 and 4 bit signals for the units digit (corresponding to $10^{-4}$ inches), 1, 2, and 4 bit signals for the tens digit (corresponding to the $10^{-3}$ inches), the 2 and 4 bit signals for the hundreds digit (representing $10^{-2}$ inches), and a logic 0 voltage level to the line carrying the sign signal. Accordingly, whenever the READ gates 66 are enabled, the number —675 corresponding to a corrective constant of —.0675 inch is applied to the input of the adder 62. Once this negative corrective constant has been added by the adder to the digitized trimming signal derived from one of the trimming potentiometers, the result will be such that, as the potentiometers are traversed across their full ranges, they will produce numbers which vary from —125 (representing a correction of —.0125 inch) to +125 (representing a correction of +.0125 inch).

Computing and displaying trimming numbers

In accordance with a particularly useful feature of the invention, means are provided for displaying the decimal trimming numbers which are being produced by the particular pair of XTR and YTR potentiometers whose associated cutting tool is in working position. As a further feature of the invention, means are also provided for permitting a machine operator to override the readout devices and to cause them to display numbers which are being produced by the digitizing system in response to any of the other four pairs of trimming potentiometers which are not then used in running of the numerical control. Thus, not only can the operator confirm that the correct trimming numbers are being supplied to the system for the tool then in use but he is also able to dial appropriate trimming numbers for any of the other four tools, or all of them, by observing the number which he is dialing on the readout devices. Specifically, in a preferred form of the invention, the numbers which are displayed, be they trimming numbers or those being monitored for future use, are not those actually produced by the digitizing device comprising the Digital Catcher 51 and the Digital Sweep Generator 102, but represent the numbers produced by those devices after the negative corrective constant has been added to them by the adder 62.

*A numerical readout.*—A readout device is disclosed in the referenced application for "Readout System for Selective Display of Digital Data on Time-Shared Conductors," with means for displaying data which appears during different program steps on the Adder Input Trunk 227 and on the output trunk 229. For purposes of explaining the present invention, a simplified form of readout is shown in FIG 4a, adapted to display data appearing on the Adder Output Trunk 229 only, and further limited to displaying the correction numbers dialed by means of trimming potentiometers in accordance with the present invention.

Referring to FIG. 4a, a pair of readout devices 70a and 70b, respectively labeled Readout Number 1 and Readout Number 2, are shown. They may be assumed to be identical and only one of them, Readout Number 1, is shown in detail. It includes a set of WRITE gates 377 having a set of inputs connected over lines 379 to the Adder Output Trunk line 229 which, as stated previously contains 41 conductors, 40 of them for carrying a binarily signaled number having up to 10 digits, and one of them carrying a signal indicating the sign of the number.

In a typical application of the present invention, the trimming number which is produced and which is to be displayed, has only three digits, although it is to be understood that if it were desired, a trimming number having a larger number of digits could also be produced and displayed. To display the trimming number produced in accordance with the invention, therefore, the exemplary readouts 70a and 70b are shown as having three decades for displaying a three digit number, and an additional stage for displaying sign. Further, as it will become apparent from a detailed description of the invention, the trimming number usually consists of the three lowest order digits processed by the numerical control system. Accordingly, the WRITE gates 377 include 13 individual sets of gates, one set for each of the 12 lines in the Adder Output Trunk 229 carrying the three lowest order digits processed by the numerical control system, and a thirteenth set for the line in the Adder Output Trunk 229 on which the sign of the signaled number is carried. One of these is shown for the AOT line 229a carrying the 8 bit of the third lowest order digit signaled on the AOT trunk 229. It includes first and second AND gates 378 and 380, whose respective output terminals comprise the SET and RESET outputs of the WRITE gate set of which they form a part. The AND gate 378 has an input connected directly to the AOT line 229a and receives the signal appearing on it. The AND gate 380 receives the inverse of the sign fed to the AND gates 378, the inverse signal being produced by an inverter 382 having an input connected to the line 229a and an output connected to one of the inputs of the AND gate 380. Both AND gates have a second input whereon they receive a gating signal from a WRITE input terminal 376 and a third input whereon they receive a gating signal from a CLOCK input terminal 385. Accordingly, provided the CLOCK and WRITE inputs are concurrently pulsed with logic 1 level signals, a logic 1 signal on the AOT line 229a causes a logic 1 level voltage to appear at the output of AND gate 378 and a logic 0 voltage level to appear at the output of the AND gate 380. A logic 0 voltage level on the AOT line 229a will cause the reverse logic signals to appear, a 0 at the AND gate 378 and a 1 at the AND gate 380.

Due to the short time for which signals representing a particular number are permitted to remain on the Adder Output Trunk 229 it is desirable that they be stored for display purposes. Accordingly, the readout 70a includes a series of gated flip flops, one for storing the momentary signal appearing on each of the 13 pairs of outputs of the WRITE gates 377. Thus, each of the three decades of the readout contain four R-S flip flops 383, and the sign decade of the readout contains a single R-S flip flop 383. Each of the flip flops has a SET input to which one of the SET outputs of the WRITE gates 377 is applied. Each of the flip flops also has a RESET input to which the corresponding RESET output of the WRITE gates is applied. A clock pulse is applied over the common clock line 385 (by means not shown) to the WRITE gates 377 and is timed to occur after the adder 62 has completed its adding cycle so as to assure that the information which is entered into the flip flops 383 represents the product of the slected adder cycle. The R-S flip flops are standard, and logic 0 and 1 level signals on their 0 and 1 outputs in response to a logic 1 signal at their SET inputs, and the reverse in response to a logic 1 voltage level at their 0 inputs. If during an adder cycle the WRITE gates 377 are pulsed at their WRITE and CLOCK inputs, signals corresponding to those appearing on the Adder Output Trunk 229 will be stored in the flip flops 383 and signaled as appropriate levels at their output terminals.

To facilitate display in decimal form of the signals formed in the flip flops 383, each decade of the readout 70a includes a binary coded decimal (BCD to D) converter 387 having 8 inputs for receiving the voltage levels appearing at the outputs of the flip flops in respective decades and having ten output terminals labeled 0 to 9. In response to receiving a number in binary code, the converter 387 is operative to produce a single signal upon that one of its output lines which corresponds to the value of the number received.

Through a set of drivers 389, the output appearing on the BCD to D converter 387 in each decade of the readout 70a drives a suitable indicating device such as a NIXIE tube 391. Tubes of this type have ten input terminals and are operative to display numerical indicia 0 through 9 as respective ones of their input terminals are energized by suitable drivers.

The sign display portion of the readout 70a includes only a single gated flip flop 383 and a pair of drivers 393 and 395 driving a sign display device 391 which may also be a NIXIE tube. If the sign of the number signaled on the Adder Output Trunk 229 is positive, a logic 1 voltage level appears at the 1 output of the gated flip flop which receives the signal on the particular line of the Adder Output Trunk 229 carrying this information. In response, the particular flip flop produces a logic 1 voltage level at its 1 output and through the driver 391 causes the readout 70a to display a + sign. Alternatively, in response to a logic 0 level on the wire of the Adder Output Trunk 229 carrying sign information, a logic 1 voltage level appears at the 0 output of the flip flop associated with the sign display stage and through the driver 395 causes the readout to display a — sign.

Readout No. 2, 70b, is identical to Readout No. 1, just described, and is operative to display numbers which appear on the Adder Output Trunk 229 at the end of a selected adder cycle. Its gates are controlled by a gating signal applied on the Readout control terminal 396.

*A computational sequence.*—The manner in which and the means whereby trimming numbers, either those which are being applied to the system or those which are only being monitored, are first corrected and then displayed will be understood best by following through the few steps of computations performed by the adder 62 in connection with forming the corrected trimming number. Two examples will be given, one with the operator pressing on one of the monitor push button switches 307 and the other with none of the push button switches depressed.

Assume first that tool No. 1 is in cutting position and that consequently a pair of phase variable signals are being derived from the XTR1 and YTR1 potentiometers. Some time during the first series of digitizing program steps 151–190 a numerically signaled number is captured by the digital catcher storage register 53, having a value determined by, and representative of the setting of the X axis trimming potentiometer XTR1. Similarly, during the second series of digitizing program steps 651–690, a second digitally signaled number will be deposited in the register 53 (it being understood that in the meantime the first number will have been read out of the register), this second number representing the setting of the Y axis trimming potentiomenter YTR1. In carrying out the invention, during the three program steps following each of the aforegoing series of program steps, the number deposited in the storage register 53 is read into the digital adder 62, and in each case, during the next cycle of the adder, the corrective constant from the corrective constant producing READ gates 66 (FIG. 8) is read into the adder 62 and subtracted from the two digitized numbers. During the next cycle of the adder, the result is applied to the readout devices 70a and 70b where they are displayed.

The first step to be performed in the brief computational sequence following the digitizing of the X trimming and Y trimming numbers is to clear the adder and this is done during program step 190 in preparation for receiving the digitized, uncorrected trimming numbers. To produce the signals required to clear the adder during program step 190 (and also during program step 690 at the end of the "digitize trim pot Y axis program steps"), a set of program gates, indicated in FIG. 8 generally as the block 397, are provided.

As will become apparent subsequently, the adder will also have to be cleared during program steps 290, 690, and 790 and consequently, the program gate block 397 will include four program gates having inputs connected to the 100, 200, 600, 700, 90, and 0 outputs of the Program Step Generator 79 in such a manner (by now well understood by the reader) that their respective outputs produce a logic 1 voltage level during the program steps 190, 290, 690, and 790 as required, and as indicated on the output lines of the program gate block. These outputs are connected through a common OR gate 398 and are carried from it through a line 401 to the Clear Adder Input Terminal 62a of the adder 62 in FIG. 4a.

With the adder 62 cleared during program step 190 (and during the adder cycle 190 which follows program step 190 by a time period equal to half the duration of the program step in the particular adder used), the contents of the digital catcher storage register 53 are next inserted into the adder 62 during the following step 191. The gating signal required to enable the digital catcher READ gates 85 during step 191 is produced by a program gate 403 which inputs are connected to the 100, the 90, and the 1 outputs of the Program Step Generator 79 (FIG. 4b). Since it will also be necessary to enable the READ gates 85 during program and adder cycle steps 691 when the digitized Y trimming signal is processed, a second program gate 405, having inputs connected to the 600, the 90 and the 1 outputs of the Program Step Generator 79 is also provided.

The outputs of the program gates 403 and 405 are gated through an OR gate 407 to one input of a further AND gate 409 having a second input energized by the TRIM line 337. Since the trimming potentiometers XTR1 and YTR1 are being utilized in the system, a logic 1 signal appears on the TRIM line 337 and the gating pulses produced during the steps 191 and 691 are transmitted through the AND gate 409 to yet another OR gate 511 and from the output of that OR gate over line 513 to the OR gate 253 in FIG. 4b whose output finally is applied directly to the control input of the READ gates 85.

The next operation, performed during step 192, is to enter into the adder the corrective constant produced by the READ gates 66. This is accomplished readily by a J-K flip flop of the same type as those described elsewhere in the application and having a J input connected to the output of the OR gate 511 and a K input which receives the signal applied at the J input inverted by an inverter 517. Finally, the CP input of the flip flop receives the PCP pulses from the Central Timing System 79. Accordingly, the J input of the flip flop is qualified during program step 191 by the gating signal appearing during that step at the output of the OR gate 409 and therefore the flip flop is set by the following PCP pulse occurring at the beginning of program step 192. In effect, the flip flop acts as a one step delay and applies a logic 1 voltage level appearing on its Q output to the control inputs of the READ gates 66 during the program step 192, causing them to signal the corrective constant, here −.0675 inch on the Adder Input Trunk 227. The same operation is also executed during step 692, at which time the flip flop is set following qualification of its J input by the gating signal appearing at the output of the OR gate 511 during program step 691.

The sign of the corrective constant that is signaled being negative, it is in effect subtracted by the adder from the digitized number. The remainder of the first substraction, representing the corrected X trimming number, appears on the Adder Output Trunk 229 during the next step 193. To cause this number to be displayed in Readout No. 1, which serves as the X trimming readout, a gating signal is applied to the WRITE control input terminal 378 of the readout gates 377. The appropriate gating pulse is produced by a program gate 519 shown in FIG. 8 as having three inputs connected to the 100, the 90, and the 3 outputs of the Program Step Generator 79 in FIG. 4b, and whose output, labeled 193, is gated through an OR gate 54 onto a line 523 labeled "to Readout No. 1 WRITE." Since the sequence of program steps indicated in FIG. 5 is repeated once every 50 seconds, it will be realized that X trimming number is thus read into the flip flops of Readout No. 1 fifty times a second and is thus constantly displayed by its indicating devices.

In a similar manner, the remainder produced by the adder during step 693 appears on the Adder Output Trunk 229 and signals the corrected Y trimming number produced under the control of the YTR1 potentiometers. These signals are displayed on Readout No. 2 which serves as the Y trimming readout on the machine and which receives during step 693 a gating signal produced by a program gate 523 shown in FIG. 8 as having its inputs connected to the 600, the 90, and the 3 outputs of the Program Step Generator 79 and having an output connected over a line labeled 693 to an OR gate 525 whose output is connected over a line 527 labeled "to Readout No. 2 WRITE" to that readout. In this manner, so long as the assumed conditions continue to exist, namely that signals from the potentiometers XTR1 and YTR1 are being utilized by the system and the operator has not depressed any of the monitor switches 307, the corrected X trim and Y trim numbers will continue to be displayed on Readouts No. 1 and 2.

Next let it be assumed that tool No. 1 is still in working position on the turret A and that the outputs of the XTR1 and YTR1 potentiometers are still being utilized to produce trimming numbers in the manner just described. But let it also be assumed that the operator has now decided to "dial in" and observe the trimming numbers which are to be used with tool No. 5 and that, for this purpose he has depressed MONITOR switch 307–5.

With the push button switch 307–5 depressed, relay M5 pulls in, connecting through its contacts the upper extremities of the potentiometers XTR5 and YTR5 to the line 13 carrying the quadrature voltage, thus energizing them. Also, through a second pair of contacts, the relay M5 connects the sliders of the XTR5 and YTR5 potentiometers to output lines 60X and 60Y respectively. Finally, through its contacts M51, the relay causes the voltage at the input to the signal converter 377 to go to logic 0 level which in turn puts a logic 1 voltage level on the MONITOR line 373. The phase variable sinusoidal voltages on the output lines 60X and 60Y are converted into a pair of phase variable square waves by the XTM and YTM squarers 349 and 351 which are then gated through the time share control AND gates 359 and 361 during the "Monitor Trim Pot X Axis" program steps 251–290 and the "Monitor Trim Pot Y Axis" program steps 751–790 respectively, and are both applied during those time periods to the Digital Catcher 51 (FIG. 4b) where they are converted during those time periods into digitally signaled, but uncorrected, X and Y trimming numbers.

To prepare the adder 62 to receive the X trimming signals produced during the monitor trim pot X axis steps 251–290, it is cleared during step 290 by means of a Clear Adder Register signal produced by the program gates 397 (FIG. 8) and applied to the CAR input of the adder over line 401. A similar Clear Adder signal is also supplied to the adder during step 790 following the "Monitor Trim Pot Y Axis" steps 751–790 to prepare it to receive the digital trim number produced during those program steps.

During the next step 291, in the MONITOR X sequence, the digitized trimming signal is transferred from the Digital Catcher 51 into the adder 62 under the control of a program gate 529 whose inputs are connected to the 200, the 90, and the 1, outputs of the Program Step Generator 79 and whose output, marked 291, is gated through an OR gate 531 to an AND gate 533 having a second input connected to the monitor line 373. With the operator pressing on the MONITOR switch 307–5, a logic 1 voltage level is being produced on the monitor line 373 so that the gating pulse produced by the program gate 529 is gated through the AND gate 533 and through the OR gate 511 over line 513 and finally through OR gate 253 in FIG. 4b to the control input of the Digital Catcher READ gates 85.

During the following step, the corrective constant produced by the READ gates 66 of FIG. 8 is entered into the adder 62 and this is again quite simply performed by the flip flop 515 which acts as a one step delay in the manner described previously so as to apply a gating signal to the control input of the READ gates 66 during program step 292. Finally, during the next step 293, the output of the adder, representing the algebraic sum of the monitored digitized X trimming number and the corrective constant is applied over the Adder Output Trunk 229 to the Readout No. 1, 70a, whose "WRITE" input 378 is gated open by gating pulses produced by a program gate 535 (FIG. 8) having inputs connected to the 200, the 90, and the 3 outputs of the Program Step Generator 79 and to the MONITOR line 373 and an output marked 293, which is gated through the OR gate 521, and applied to the readout over line 523. To prevent the program gates 519 and 523 from applying the digitized trimming numbers dialed by the potentiometers XTR1 and YTR1 to the readout, they are disabled by a logic 0 voltage level derived from the MONITOR line 373 by an inverter 536, and applied to the program gates over the $\overline{\text{MONITOR}}$ line 538.

The same sequence of calculations also follows the "Monitor Trim Pot Y Axis" steps 751–790, with the digitized Y trimming number produced in response to the monitored YTR5 trimming potentiometer being transfered from the Digital Catcher 51 into the adder 62 during program step 791 under control of a gating pulse produced by a program gate 537 (FIG. 8) having inputs connected to the 700, the 90, and the 1 outputs of the Program Step Generator 79, and an output, labeled 791, gated through the OR gate 531, the AND gate 533, the OR gate 511, and finally the OR gate 253 (FIG. 4b) to the control inputs of the Digital Catcher READ gates 85.

During the next step, under control of a gating pulse produced by the flip flop 515, the corrective constant is read into the adder 62 from the READ gates 66. The result, representing the trimming number dialed by the YTR5 trimming potentiometer, is applied to and displayed by Readout No. 2, 70b, during step 793. The required gating signal is produced by a program gate 539 whose inputs are connected to the 700, the 90, and the 3 outputs of the Program Step Generator 79 and to the MONITOR line 373 and whose output, labeled 793, is gated through the OR gate 525 and over the line 527 to the WRITE input 396 of Readout No. 2.

From the foregoing examination of the sequence followed by the system, it is seen that, so long as none of the operator's MONITOR switches 307 is depressed, the trimming number then being utilized by the system are displayed undisturbed on the Readouts No. 1 and 2, since the program gates 535 and 539 required to open the readouts are not enabled by a MONITOR signal. It is also seen that by pressing on any one of the five MONITOR display switches 307, the operator can disable the program gates 519 and 523 required to open the Readouts No. 1 and 2 during the time periods in which the digitized trimming signals being utilized by the system appear on the Adder Output Trunk and can substitute for these gating signals those produced by the program gates 535 and 539 during the time periods in which the digitized trimming signals produced by the pair of trimming potentiometers which he wishes to observe appear on the Adder Output Trunk line, namely during steps 293 and 793.

Thus the operator can preselect the desired trimming numbers for any particular tool, except the one in use, by pressing the monitor select switch associated with the particular pair of trimming potentiometers assigned to that tool and he can dial the exact number he wants to be produced for the X correction by turning the XTR potentiometer on display and observing the output produced on Readout No. 1 and he may then similarly dial the exact Y correction number to be produced by turning the slider of the YTR potentiometer and observing the output on Readout No. 2.

Modifications

It will be apparent to those skilled in the art that the particular arrangement shown in FIG. 7 may be modified to suit the requirements of the particular numerical control with which it is to be used. The number of tools may be different and the number of trimming potentiometers per tool may also be greater or less than 2. The arrangement shown for overriding the normal display of trimming signals being used by the system to monitor trimming signals produced by other sets of trimming potentiometers might also be modified without departing from the spirit of the invention, and, if desired, a separate pair of readouts could be used for the latter purpose.

Figure 9A:
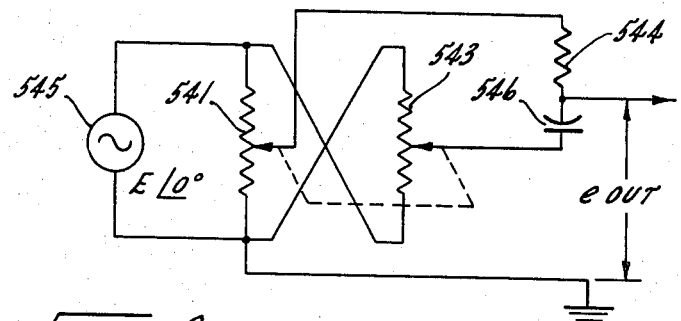
FIG. 9 shows alternative circuit arrangements for the potentiometers indicated in FIG. 7.

Similarly, the particular manner of producing a phase variable sinusoidal voltage by means of potentiometers shown in FIG. 7 may be modified, although it has been found that the one shown is simplest and best of several arrangements that have been considered. Two of these are shown in FIG. 9. The circuit in FIG. 9a includes a pair of ganged potentiometers 541 and 543 connected at their opposite extremities to a single sinusoidal voltage source 545 but with corresponding extremities being connected to opposite terminals of the source. Their sliders are connected across a series connected resistor capacitator pair 544, 546. The output signal is between the junction of the resistor capacitor pair and ground. Thus a phase variable voltage is produced as the sliders are transversed across their range of travel even though only a single source of sinusoidal voltage is used. Such an arrangement may have its advantages where a source of quadrature voltage is not available, but it requires two potentiometers and two switching contacts, one for each of the sliders, if it is to be used in place of one of the trimming potentiometers shown in FIG. 7b.

Figure 9B:
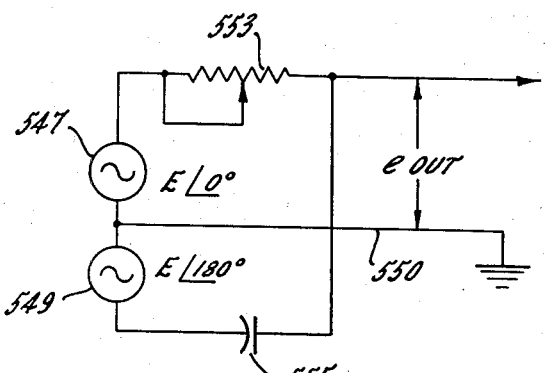

The arrangement shown in FIG 9b demonstrates how a phase variable output may be derived from a single potentiometer which is energized by a pair of voltages which are 180° out of phase with one another. One terminal of each of the two voltage sources 547 and 549 is connected to a common ground 550 and a potentiometer 553 is connected across the second terminals of the two voltage sources through a capacitor 555. The output appears between ground and the junction of the capacitor 555 and the potentiometer 553. It varies in phase across a predetermined range as the slider of the potentiometer is traversed across its full range. This arrangement has been found inferior in that the phase of the output changes nonlinearly with slider travel and also because it is sensitive to changes of capacitance and resistance which may occur due to changes in temperature and humidity. The preferred embodiment, previously shown in detail, has been found particularly stable because the phase of the output voltage varies as the ratio of the resistances on either side of the slider, shown in FIG. 1a as R1 and R2, and does not vary significantly with changes in the total resistance value of the potentiometer. Consequently, the phase variable signal, and the digitized number, produced by such an arrangement is essentially free of drift despite changes in temperature and humidity.

Conclusion

From the foregoing, it is seen that there has been brought to the art of digital numerical control a system which permits the generation of digitally signaled numbers which may be selected very accurately and easily by unskilled persons through the simple expedient of turning the slider on a potentiometer which need not be particularly precise or linear or stable.

By means of a system incorporating the invention, several trimming numbers, compensating for individual characteristics of each of several tools in a turret, or in any other tool holding device, may be generated. As each tool is indexed itno working position, the individual trimming numbers generated for that tool may be automatically injected into the numerical control system so that the necessary corrections can be made, and these numbers may also be displayed as numerical indicia so that a machine operator can ascertain that appropriate trimming numbers are being injected for each tool.

Furthermore, for tools yet to be indexed, the operator can dial in sets of trimming numbers accurately and conveniently by turning the sliders of trimming potentiometers while observing the numbers so dialed on a numerical display unit.

I claim as my invention:

1. Apparatus for producing a digital number whose value is variable between desired predetermined limits, comprising in combination
   (a) means for generating a digital sweep formed of signals digitally representing a reference number which during successive time intervals, repeatedly and cyclically changes from a first to a second predetermined value,
   (b) means for producing at least one sinusoidal voltage, having a constant phase relative to the time intervals of said sweep,
   (c) means adjustable within a predetermined range and connected to receive the output of said voltage producing means for producing, in response to said output, a voltage whose phase relative to the phase of said output varies between predetermined limits as the setting of said adjustable means is varied across its range,
   (d) number capturing means responsive to said sweep and to said phase variable voltage for deriving from said digital sweep and storing a digitally signaled number representing the phase angle of said phase variable signal relative to the phase of the output of said voltage producing means, said number having a range of values corresponding to the range of adjustment of said adjustable means, said range of values falling between said first and second predetermined numbers,
   (e) means for producing a digitally signaled correction number, and (f) means for effectively subtracting said correction number from said digitally signaled number.

2. The apparatus of claim 1 additionally characterized in that means are provided for displaying in the form of decimal indicia the number produced by said subtracting means after performing said subtracting operation.

3. The apparatus of claim 1 further characterized in that the digitally signaled correction number is equal to approximately half of the sum of the lowest and the highest number within said range of values.

4. The apparatus of claim 1 further characterized in that said adjustable means comprises a single potentiometer having a resistive portion and a single slider movable along said portion and in that said voltage producing means produces a pair of sinusoidal voltages which are 90° out of phase with one another and which appear between a common point and opposite extremiites of said potentiometer's resistive portion so that as said slider is moved along said resistive portion, a single sinusoidal voltage appears beween said slider and said common point having a phase which changes from substantially that of one of said sinusoidal voltages to substantially that of the other of said sinusoidal voltages as said slider is traversed between said opposite extremities.

5. Apparatus for producing a pair of digital numbers, the value of each of which is variable between predetermined limits comprising in combination
  (a) means for generating a digital sweep formed of signals digitially representing a reference number which during successive time intervals repeatedly and cyclically changes from a first to a second predetermined value,
  (b) means for producing at least one sinusoidal voltage having a constant phase relative to the time intervals of said sweep,
  (c) first and second pairs of means, each independently adjustable over a predetermined range for deriving from said at least one sinusoidal voltage a recurring voltage whose phase relative to said sinusoidal voltage is variable over a predetermined range corresponding to said range of adjustment,
  (d) means responsive to said sweep and to a phase variable sigial for deriving from said sweep and temporarily storing a digitally signaled number representing the phase angle of the phase variable voltage relative to the periods of said digital sweep,
  (e) means for selecting the output of a desired one of said first and second pair of adjustable means,
  (f) means for causing the respective ones of the two selected outputs to be applied to said number catching means during first and second series of regularly recurring sweep periods, sweep periods of the first series being interspersed with sweep periods of the second series so that there are in said digit catching means, during said first and second series of sweep periods respectively, a first and a second digitally signaled number respectively representing the settings of respective ones of the selected pair of adjustable means, and
  (g) means for displaying the numbers temporarily stored in said digit catching means during said first and second series of recurring periods so that the number produced in response to the signals from the selected pair of adjustable means may be observed.

6. The apparatus of claim 5 further characterized in that each of said independently adjustable means includes at least one potentiometer having a resistive portion connected to receive said at least one sinusoidal voltage and a slider movable across said resistive portion for varying the phase of said recurring voltage.

7. Apparatus for producing signals representing in digital form a number which is adjustable to any value within a predetermined range, comprising in combination
  (a) digital sweep means for producing a plurality of binary signals collectively representing a number which at uniformly spaced instants within each of immediately succeeding cyclically repeating identical periods changes from one value to another and during each period sweeps from a first to a second predetermined value,
  (b) means for producing at least one sinusoidal source voltage having a frequency equal to said cyclically repeating periods and a predetermined fixed phase relative to such periods,
  (c) adjustable phase shifting means energized by said source voltage for producing a recurring waveform voltage having said frequency but adjustable in phase relative to said source voltage,
  (d) a catching storage register having input terminals and output terminals, and
  (e) means responsive to said recurring waveform voltage for applying to said input terminals said binary signals from said sweep means during each of a succession of said periods at instants when said recurring voltage reaches a predetermined point in its waveform,
  (f) whereby said output terminals signal in digital form a number which is changed to different values as said phase shifting means is adjusted.

8. The combination set forth in claim 7 further characterized in that said digital sweep means comprises a counter of predetermined count capacity and a pulse source of predetermined frequency continuously supplying pulses to the counter so that it counts to a full count and then begins over in immediately successive cycles, said counter having a plurality of output terminals upon which appear said binary signals to represent from instant to instant the numerical value of the number held in said counter.

9. The combination set forth in claim 7 further characterized in that said recurring waveform voltage is of sinusoidal waveform, and said predetermined point on said waveform is one of the zero crossing points.

10. The combination set forth in claim 7 further including a device for visually displaying the number represented by digital signals supplied thereto, and means for supplying to said device once during each of a selected sucession of said periods the signals existing on said output terminals, whereby said phase shifting means may be adjusted while said device is observed until the adjustable number has a desired value.

11. The combination set forth in claim 9 further characterized in that said adjustable phase shifting means includes
  (C1) means responsive to said sinusoidal source voltage for producing a quadrature sinusoidal voltage displaced by 90° from the source voltage,
  (C2) means effectively connecting said source voltage and quadrature voltage in series with a common junction therebetween,
  (C3) a potentiometer including
    (C3i) a resistor connected in series with said source voltage and quadrature voltage, and
    (C3ii) a slider adjustable in its point of contact along said resistor,
  whereby the output voltage appearing between said slider and said junction varies in phase relative to said source voltage as said slider is moved along said resistor.

12. The combination set forth in claim 7 further characterized in that a plurality of said adjustable phase shifting means are provided together with means for energizing any selected one of such phase shifting means by said source voltage and means for transmitting the recurring waveform voltage from the selected one of the phase shifting means to said means for applying binary signals from said sweep means to said input terminals.

13. Apparatus for producing signals representing in digital form a number which is adjustable to any value within a predetermined range, comprising in combination (a) digital sweep means for producing a plurality of first binary signals collectively representing a multidigit sweep number which at uniformly spaced instants within each of immediately succeeding cyclically repeating identical periods changes from one value to the next and during each period sweeps from a first to a second predetermined value, (b) means responsive to at least a part of said first binary signals for producing at least one sinusoidal source voltage having a frequency equal to that of said repeating periods and a predetermined fixed phase relative to such periods, (c) adjustable phase shifting means energized by said source voltage for producing a recurring waveform voltage having said frequency but adjustable in phase over a given angle range relative to said source voltage, (d) a catching storage register having input terminals and output terminals, (e) means responsive to said recurring waveform voltage for applying to said input terminals said first binary signals at instants when said recurring voltage reaches a predetermined point in its waveform during each of a selected succession of said periods, so that said register stores and produces second binary signals on its output terminals representing a caught number identical to that represented by said first binary signals at such instants, (f) means for producing a plurality of third binary signals representing in digital form a correction number, and (g) means responsive to said second and third binary signals for producing fourth binary signals digitally representing a final number equal to an algebraic combination of said caught number and said correction number, said final number being adjustable to any value within a predetermined range by adjustment of said phase shifting means.

14. The combination set forth in claim 13 further characterized in that the span of predetermined range of values over which said final number may be adjusted is determined by the difference between said first and second predetermined values between which said sweep number sweeps and the given angle range over which said recurring waveform voltage is adjustable, and the upper and lower limits of said span are determined by said predetermined fixed phase and the value of said correction number.

15. The combination set forth in claim 14 further characterized in that said correction number is equal to one-half the sum of the two values of the caught number when said phase shifting means is set to make the recurring voltage have one limit or the other limit of its given range of phase relative to said source voltage, and said means for producing said fourth binary signals subtracts said correction number from said caught number, whereby said final number varies from a negative limit value to zero to a positive limit value as said phase shifting means is adjusted from one end progresively to the other end of its given angle range.

16. The combination set forth in claim 13 further characterized by means responsive to binary signals for visually displaying a multidigit decimal number represented by such signals, and means for applying to the latter means said fourth binary signals, whereby the actual value of said final number may be observed and determined while said phase shifting means is being adjusted.

17. The combination set forth in claim 13 further characterized in that a plurality of said adjustable phase shifting means (c) are included, together with means for energizing any selected one of such means with said source voltage, and means for transmitting the recurring waveform voltage from the selected one of said phase shifting means to said means (e).

18. The combination set forth in claim 13 further characterized by (h) means for producing a fifth plurality of binary signals representing an original command number to which an element is to be moved, (i) means responsive to said fifth and fourth binary signals for producing a sixth plurality of binary signals representing an adjusted command number equal to an algebraic combination of said original command number and said final number, and (j) means responsive to said sixth binary signals for moving an element to a position corresponding to said adjusted command number.

19. The combination set forth in claim 18 furhter characterized in that a plurality of said phase shifting means (c) are included, together with means for energizing any selected one of such phase shifting means by said source voltage, and means for transmitting the recurring voltage from the selected one of the phase shifting means to said means (e), whereby after said plurality of adjustable phase shifting means have been set to produce, when effective, different values of said final number, any original command number may be changed by an amount equal to any one of the different values of the final number by selectively energizing and utilizing the appropriate corresponding one of said phase shifting means.

References Cited

UNITED STATES PATENTS

| | | | |
|---|---|---|---|
| 2,857,564 | 10/1958 | Gray | 340—198 |
| 3,022,459 | 2/1962 | Alper | 323—121 |
| 3,064,168 | 11/1962 | Dosch | 340—198 |
| 3,175,138 | 3/1965 | Kilroy | 340—347 |
| 3,287,628 | 11/1966 | Keiper | 323—125 |
| 3,011,110 | 11/1961 | Ho | 235—92.62 |
| 3,421,083 | 1/1969 | Bosworth | 329—99 |

MAYNARD R. WILBUR, Primary Examiner

J. GLASSMAN, Assistant Examiner

U.S. Cl. X.R.

340—347